(12) United States Patent  (10) Patent No.: US 8,342,470 B2
Shortell  (45) Date of Patent: Jan. 1, 2013

(54) HANGERS AND METHODS OF HANGING ITEMS

(76) Inventor: Dorota Shortell, Portland, OR (US)

(*) Notice: Subject to any disclaimer, the term of this patent is extended or adjusted under 35 U.S.C. 154(b) by 562 days.

(21) Appl. No.: 12/360,705

(22) Filed: Jan. 27, 2009

(65) Prior Publication Data

US 2009/0189037 A1  Jul. 30, 2009

Related U.S. Application Data

(60) Provisional application No. 61/023,886, filed on Jan. 28, 2008.

(51) Int. Cl.
*A47H 1/10* (2006.01)

(52) U.S. Cl. ........ 248/329; 248/693; 248/492; 248/339; 242/378.3; 211/119.004

(58) Field of Classification Search .................. 248/685, 248/693, 579, 492, 493, 495, 60, 329, 339; 242/378.2, 378.3; 211/117, 119, 119.004
See application file for complete search history.

(56) References Cited

U.S. PATENT DOCUMENTS

| | | | | |
|---|---|---|---|---|
| 492,808 A * | 3/1893 | Jenkins | ............ | 248/579 |
| 613,841 A * | 11/1898 | Lord | ............ | 248/492 |
| 685,856 A * | 11/1901 | Menuez | ............ | 248/334.1 |
| 703,709 A * | 7/1902 | Olmstead | ............ | 242/376 |
| 862,011 A * | 7/1907 | Patrick et al. | ............ | 242/379.2 |
| 969,195 A * | 9/1910 | Rothstein | ............ | 248/493 |
| 3,424,422 A * | 1/1969 | Klangos | ............ | 248/561 |
| 5,413,297 A | 5/1995 | Adams | | |
| D360,355 S | 7/1995 | Adams | | |
| 5,535,971 A | 7/1996 | Adams | | |
| 5,553,823 A | 9/1996 | Protz, Jr. | | |
| 5,607,131 A | 3/1997 | Adams | | |
| 5,695,147 A * | 12/1997 | Zimmerman | ............ | 242/388.3 |
| D408,725 S | 4/1999 | Adams | | |
| 6,029,830 A * | 2/2000 | Manookian | ............ | 211/87.01 |
| 6,267,257 B1 | 7/2001 | DeBruyn | | |
| 6,302,365 B1 | 10/2001 | Catanzarite et al. | | |
| 6,311,851 B1 | 11/2001 | Knudsen, Sr. et al. | | |
| 6,325,344 B1 | 12/2001 | Gary et al. | | |
| 6,575,416 B1 | 6/2003 | Avinger | | |
| 6,578,394 B2 * | 6/2003 | Yin | ............ | 70/58 |
| 6,854,610 B2 | 2/2005 | Adams | | |

(Continued)

OTHER PUBLICATIONS

Clever Hangers, "Clever Hanger . . . because it is!," http://www.cleverhanger.com, 2008.

*Primary Examiner* — Bradley Duckworth
(74) *Attorney, Agent, or Firm* — Mohr Intellectual Property Law Solutions, PC

(57) ABSTRACT

Hangers and methods for supporting an item from a structure. In some examples, the hanger includes a body configured to support the item and lines configured to bear tension, the lines supporting the body from corners of the structure. In some examples, the hanger includes an adjustment mechanism mounted to the body and coupled to the lines, wherein the adjustment mechanism is configured to selectively adjust the position of the body relative to the structure.
In some examples, the method includes forming a portion of a first line into a first loop, forming a portion of a second line into a second loop, placing the first loop over the first corner of the structure, placing the second loop over the second corner of the structure, securing the item to the first line, and securing the item to the second line.

25 Claims, 28 Drawing Sheets

U.S. PATENT DOCUMENTS

| | | |
|---|---|---|
| 6,857,608 B2 | 2/2005 | Avinger |
| 6,866,940 B1 * | 3/2005 | Laughlin .................... 428/542.2 |
| 7,185,864 B2 | 3/2007 | Adams |
| 7,207,088 B2 | 4/2007 | Adams et al. |
| 7,234,671 B2 | 6/2007 | Avinger |
| 2006/0006276 A1 * | 1/2006 | Wyatt ............................ 242/588 |
| 2006/0196091 A1 * | 9/2006 | Ricci et al. ...................... 40/601 |

* cited by examiner

HANGERS AND METHODS OF HANGING ITEMS

CROSS-REFERENCE TO RELATED APPLICATION

This application claims priority under 35 U.S.C. 119(e) to U.S. Provisional Patent Application No. 61/023,886 entitled "Device and Method for Hanging Items on Doors or Other Structures," filed Jan. 28, 2008, the disclosure of which is incorporated herein by reference.

BACKGROUND

The present disclosure relates to hangers and methods of hanging items on structures. Traditionally, wreaths and other decorations have been hung from doors and other surfaces using nails, screws, screw-in hooks, or other fasteners. These fasteners tend to permanently deface the door or structure, and people generally prefer to avoid defacing doors and other structures when hanging decorations and other objects.

Various designs have been developed to avoid permanently defacing doors when hanging decorations. For example, some designs involve hooks fastened to doors with non-marring fasteners, adhesives, magnetic materials, and suction cups. Examples of such designs are provided in U.S. Pat. Nos. D360,355, D408,725, and 6,325,344, which are expressly incorporated herein by reference for all purposes.

However, these designs are not always entirely satisfactory due to the large and heavy nature of objects that are often hung, such as wreaths. Further, frequently opening and closing a door tends to cause these types of hooks to fall off the door over time. Moreover, abruptly opening or closing the door can cause the hook to fall off the door as well.

Other designs utilizing over-the-door hooks have been developed to hang objects such as wreaths and decorations on doors. Examples of these designs are provided in U.S. Pat. Nos. 5,413,297, 5,535,971, 5,553,823, 5,607,131, 6,302,365, and 6,311851, which are expressly incorporated herein by reference for all purposes. These types of hooks or hangers allow for heavier and larger items, but are limited in certain ways due to the fact that they typically require relatively large hooks.

The limitations include an inability to close a door when using a thick hook and marring the door when the door is able to close. The thicker hooks, especially those made of plastic, but also some metal ones, do not allow the door to close. This is especially true in newer doors that have a smaller distance between the top of the door and the door frame, as well as when there is tight fitting weather stripping. When the door is able to close despite the thick hook, the top of the hook (the portion that is over the door) often scratches or mars the door frame as the door is opened and closed.

Other over-the-door hanger or hook designs include those shown in U.S. Pat. Nos. 6,267,257; 6,575,416; 6,854,610; 6,857,608; 7,234,671; 7,185,864, 7,207,088, which are expressly incorporated herein by reference for all purposes. However, these designs also tend to mar the frame of a door when used to hang objects.

One product attempting to address the door closing and door frame marring issues is sold under the trade name Clever Hanger (www.cleverhanger.com, patent status unknown). This device uses an "L" shaped metal bracket and a flexible monofilament line to hang a wreath on the top edge of the door. However, this product still has the potential to mar the door frame because it requires that metal be placed between the top of the door and the door frame. This product also fails to provide a hook to which a wreath may be attached. Instead, a user must tie the line to the wreath, which is inconvenient for the user and does not allow for easily changing from one decoration to another.

SUMMARY

The specification describes hangers and methods for supporting an item from a structure. In some examples, the hanger includes a body configured to support the item and first and second lines configured to bear tension, the first and second lines supporting the body from corners of the structure. In some examples, the hanger includes a body defining a cavity and being configured to support the item, an adjustment mechanism mounted to the body inside the cavity, a line configured to bear tension and coupled to the adjustment mechanism and to the structure, wherein the adjustment mechanism is configured to selectively adjust the position of the body relative to the structure by adjusting the length of the line extending between the adjustment mechanism and the structure.

In some examples, the method includes forming a portion of a first line into a first loop, forming a portion of a second line into a second loop, placing the first loop over the first corner of the structure, placing the second loop over the second corner of the structure, securing the item to the first line, and securing the item to the second line.

DETAILED DESCRIPTION

The disclosed hangers and methods of hanging items will become better understood through review of the following detailed description in conjunction with the drawings and the claims. The detailed description, drawings, and claims provide merely examples of the various inventions described herein. Those skilled in the art will understand that the disclosed examples may be varied, modified, and altered without departing from the scope of the inventions as defined in the claims, and all equivalents to which they are entitled. Many variations are contemplated for different applications and design considerations; however, for the sake of brevity, each and every contemplated variation is not individually described in the following detailed description.

Figure 1:
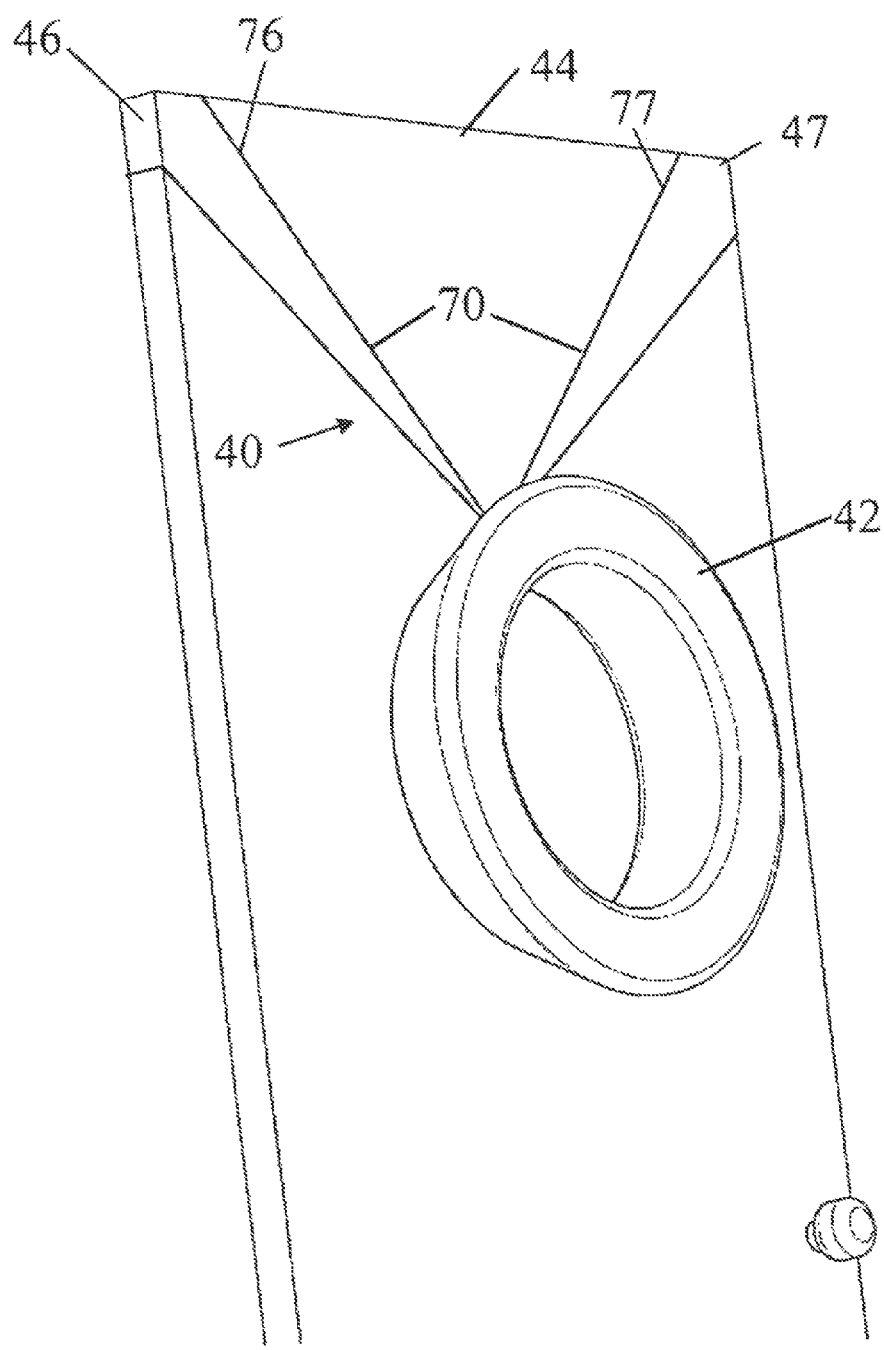
FIG. 1 is an isometric view of a first hanger example including first and second lines looped around corners of a door and coupled to an object for supporting the object from the door.

With reference to FIG. 1, a hanger 40 for supporting an item or object 42 from a structure 44 is shown. Hanger 40 includes a tension bearing line 70 forming loops 76 and 77. Loops 76 and 77 extend around corners 46 and 47 of structure 44, respectively. In the example shown in FIG. 1, object 42 is coupled directly to line 70.

Item 42 may be anything that a user may wish to hang, such as wreaths, decorations, clothing, artwork, bulletin boards, scientific equipment, medical equipment, toys, and sporting equipment. Lines 70 and 72 may be formed from string, thread, cord, wire, monofilament, or any other similar flexible material.

Structure 44 may be any object capable of supporting the weight of item 42. For example, structure 44 may comprise walls, doors, bed frames, bookshelves, cabinet doors, drawers, grave stones, art gallery walls, movie sets, stage sets, windows, chairs, computer monitors, refrigerators, mirrors, and murals. Structure 44 may be rectangular in shape, as shown in FIGS. 1-3, but need not have a rectangular shape.

Figure 2:
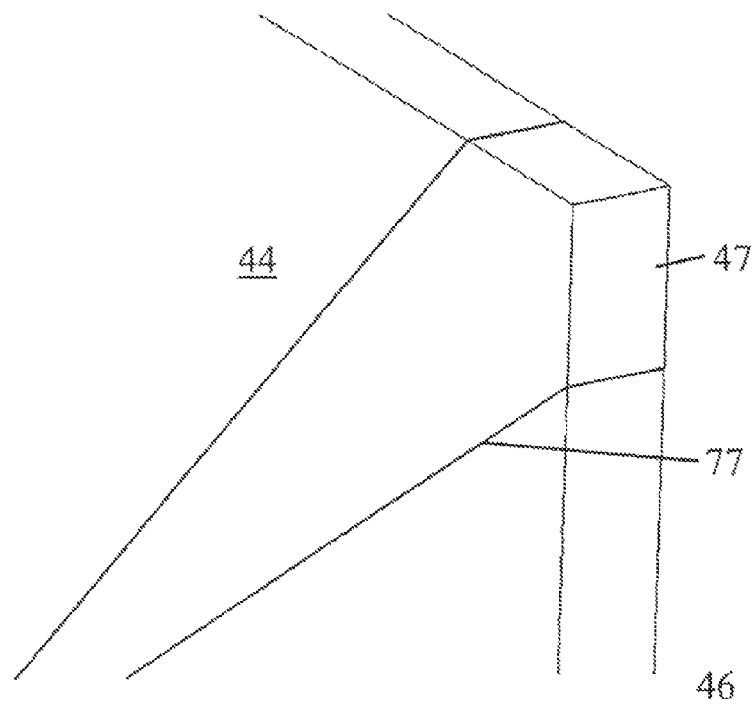
FIG. 2 is an isometric view of a front face and corner of the door of FIG. 1 showing the second line looped around a corner of the door.
Figure 3:
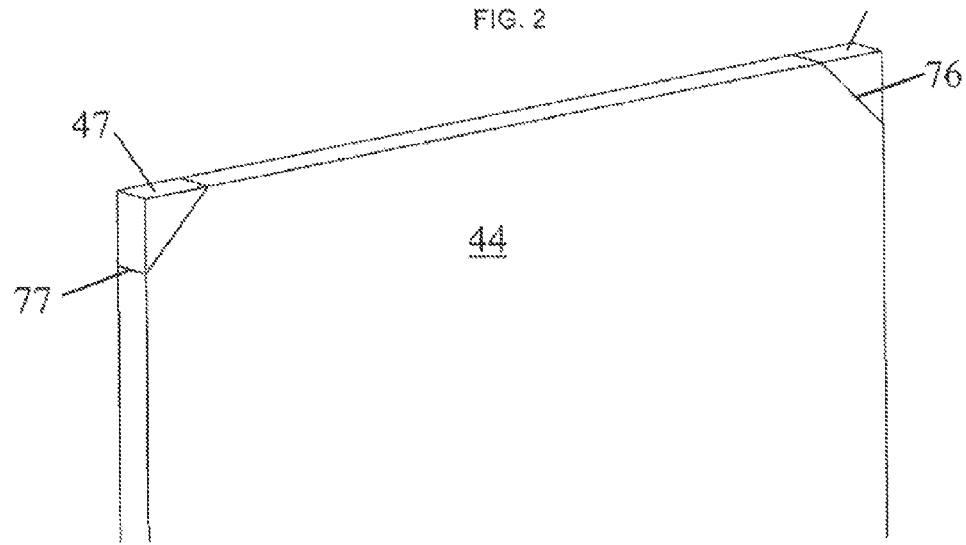
FIG. 3 is an isometric view of a back face of the door of FIG. 1 showing the first and second lines looped around corners of the door.

As shown in FIGS. 1-3, loops 76 and 77 may be secured to corners 46 and 47 by extending the loops to the opposite or rear side of structure 44. Extending loops 76 and 77 to the rear side reduces the likelihood that the loops will slide off corners 46 and 47. Moreover, the weight of item 42 tends to retain the loops in position on the corners. When a given structure does not include corners, such as an oval-shaped door, another string or piece could be added on the backside or top of the door to hold the loops together and prevent them from sliding off.

Figure 4:
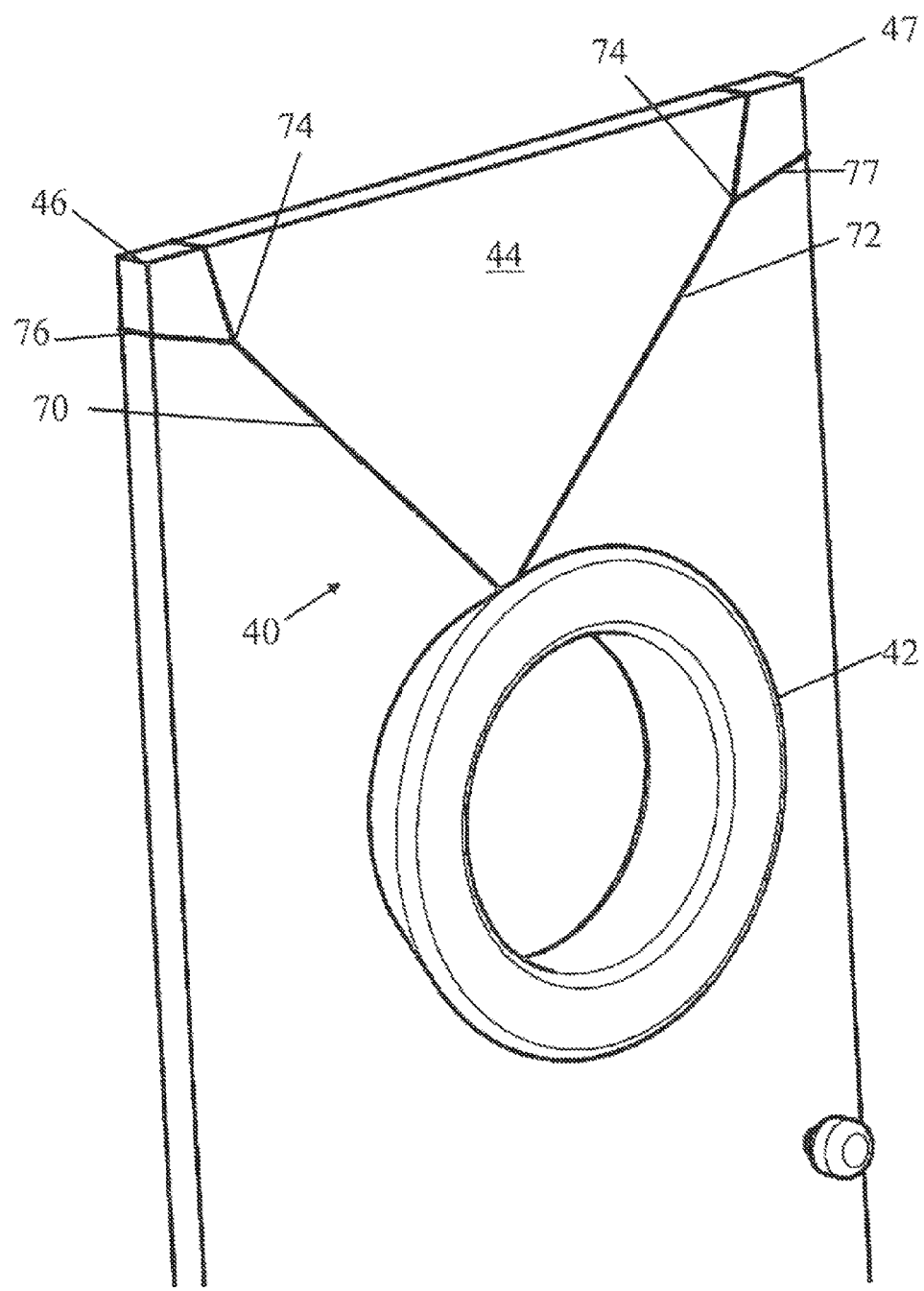
FIG. 4 is an isometric view of the hanger of FIG. 1 including first and second lines forming loops with first and second fasteners.

As shown in FIG. 4, in some examples hanger 40 may include a fastener 74 that binds together one portion of line 70 with another portion of line 70 to form loop 76. Likewise, a second fastener 74 is shown in FIG. 4 binding portions of line 72 together to form loop 77. Fastener 74 may include a crimp, a knot in the string, a clamp, a bead, or a clip. Thus, unlike the examples shown in FIGS. 1-3, hanger 40 including fasteners or clips 74 can be hung not only where the two loops meet, but also from lines extending from below the loops.

In FIG. 4, loop 76 is placed around top, left corner 46 while loop 77 is placed around top, right corner 47. Comparing FIGS. 1 and 4, it can be seen that the loops can be made smaller in the FIG. 4 example because the loops only need to be big enough to fit around the corners of structure 44.

Figure 5:
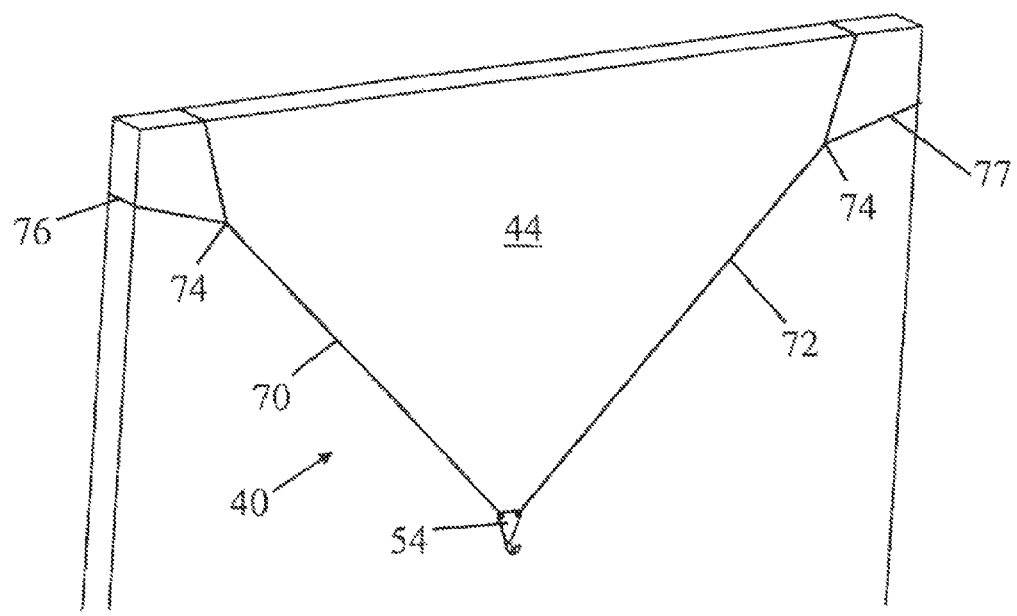
FIG. 5 is an isometric view of the hanger of FIG. 4 including a hook that is coupled to the two lines and configured to support the object.
Figure 6:
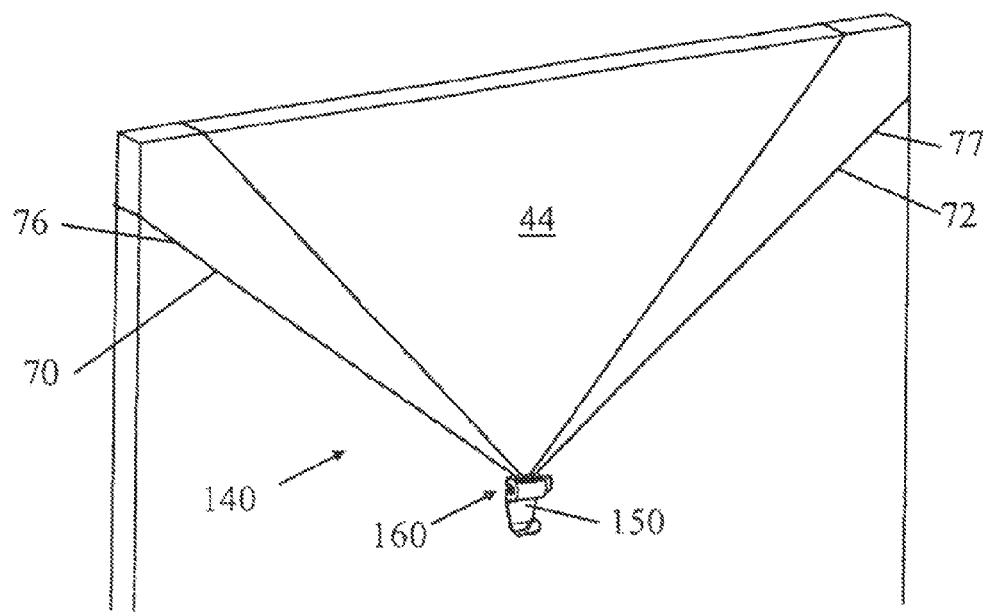
FIG. 6 is an isometric view of a second hanger example including a body configured to support an object and two lines that are coupled to the body and looped around corners of a door.

Item 42 may be attached directly to lines 70 and 72, as shown in FIG. 4. Alternatively, item 42 may be hung on a hook, as shown in FIG. 5, or hung from a body 150, as shown in FIG. 6. As explained in more detail below, in examples where a hanger includes a hook or an adjustment mechanism, fasteners 74 result in the hook or adjustment mechanism needing only to connect with two line portions instead of four, as would be the case without fasteners 74. This simplification means a lower probability of the strings getting entangled or installed incorrectly.

In the example shown in FIG. 1, loop 76 is placed around top, left corner 46 while the loop 77 is placed around top, right corner 47. Item 42 is suspended from loops 76 and 77 in the front of structure 44 where the two loops meet. Item 42 may be attached directly to the loops, as shown in FIG. 1. Alternatively, as shown in FIG. 5, in some examples hanger 40 includes a hook 54 coupled to lines 70 and 72 and the item may be hung from or supported by hook 54.

Figure 7:
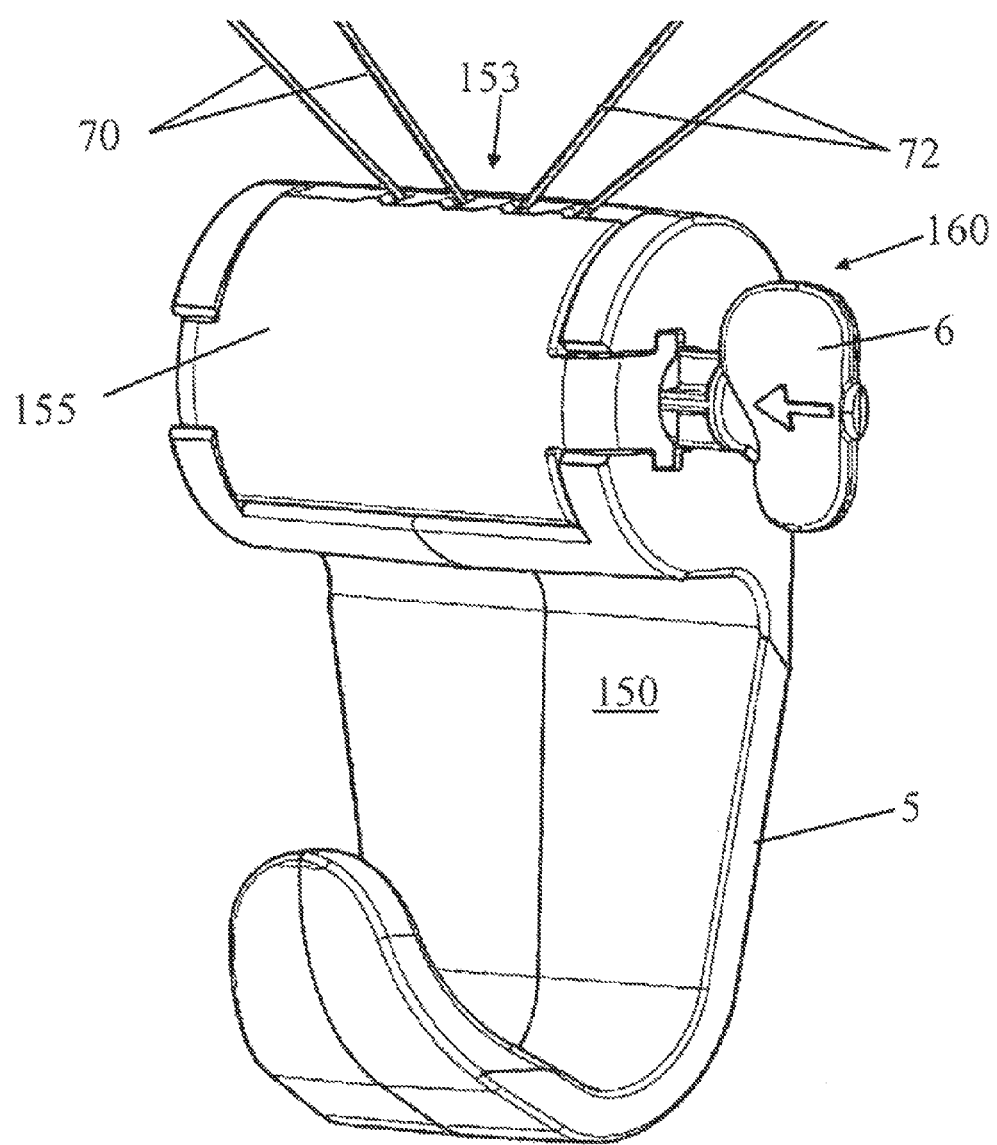
FIG. 7 is an isometric view of a portion of the hanger of FIG. 6 showing the lines extending into the body and a spool mounted within the body.

Turning attention to FIG. 6, a hanger 140 is shown for supporting an item from structure 44. Hanger 140 includes first and second tension bearing lines 70 and 72, which are formed into loops 76 and 77, respectively. In some examples, a single line or a plurality of lines is provided instead of two lines. Hanger 140 further includes a body 150 configured to support an item and an adjustment mechanism 160 configured to adjust the position of body 150 relative to structure 44. As shown in FIG. 7, hanger 140 includes a cover 155, which is selectively removable.

Figure 8:
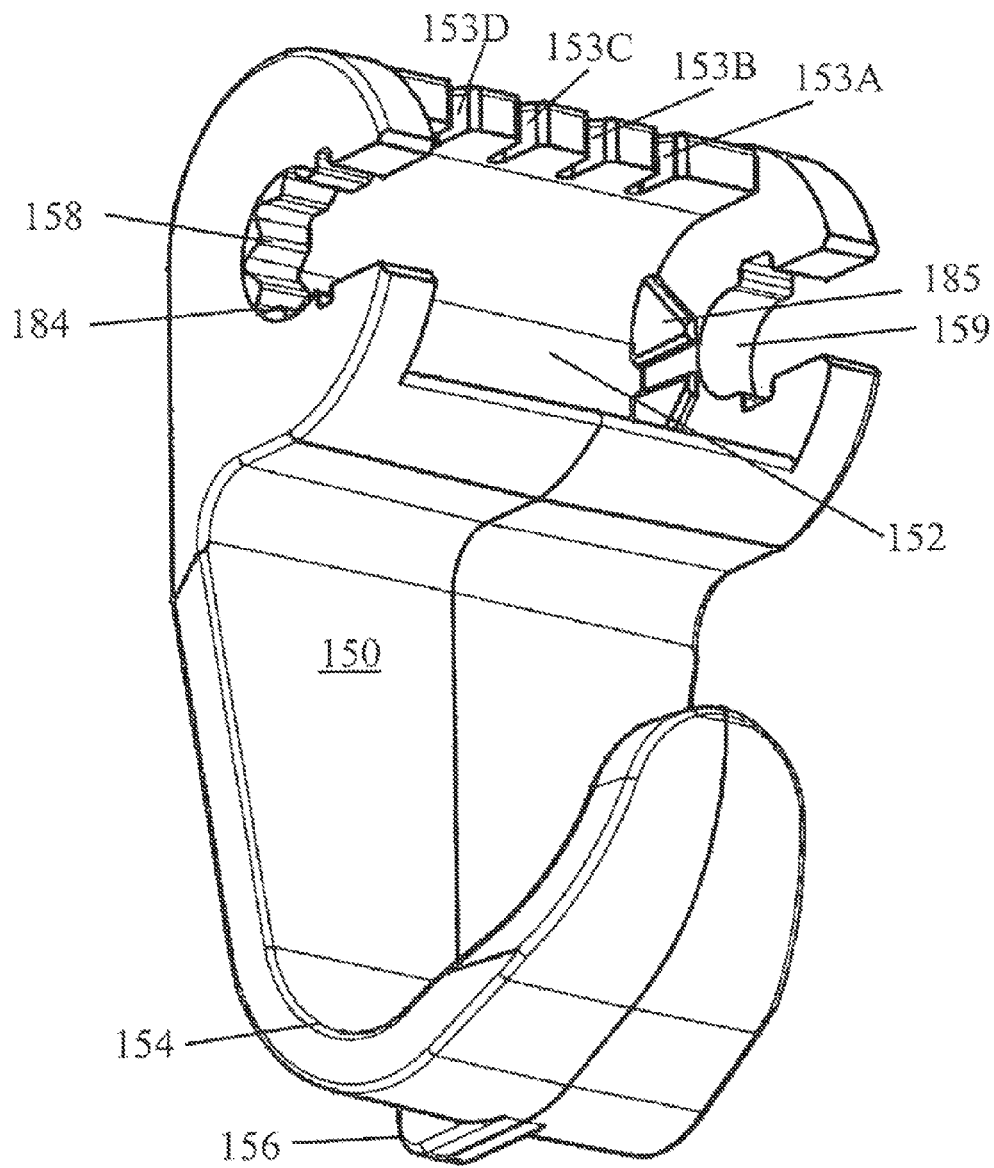
FIG. 8 is an isometric view of the body of FIG. 6 with a cover removed to show a cavity and guide slots defined by the body.

In the example shown in FIGS. 6-8, body 150 defines a cavity 152, a hook 154, and guide slots 153A-D. Hook 154 provides a J-shaped area onto which the item may be supported or hung. Any variety of hook or item supporting shape may be used. In the example shown in FIG. 8, hook 154 defines a rib 156, which provides structural rigidity. The structural rigidity provided by rib 156 reduces the strain on hook 154 from supporting the item, which helps reduce the risk of hook 154 breaking or deforming when supporting the item.

Guide slots 153A-D in FIG. 8 guide lines 70 and 72 as they extend into and out of cavity 52. Guiding the lines is useful for reducing the risk of the lines becoming tangled. Further, guide slots 153A-D help guide the lines to particular portions of adjustment mechanism 160 for coupling to adjustment mechanism 160.

Figure 11:
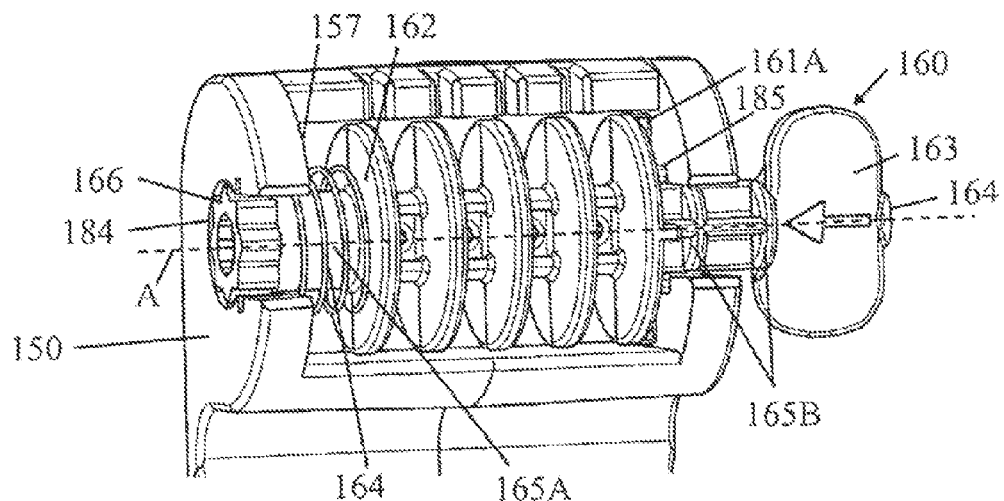
FIG. 11 is an isometric view of the body of FIG. 6 with a cover removed to show the spool biased to the locked position.
Figure 12:
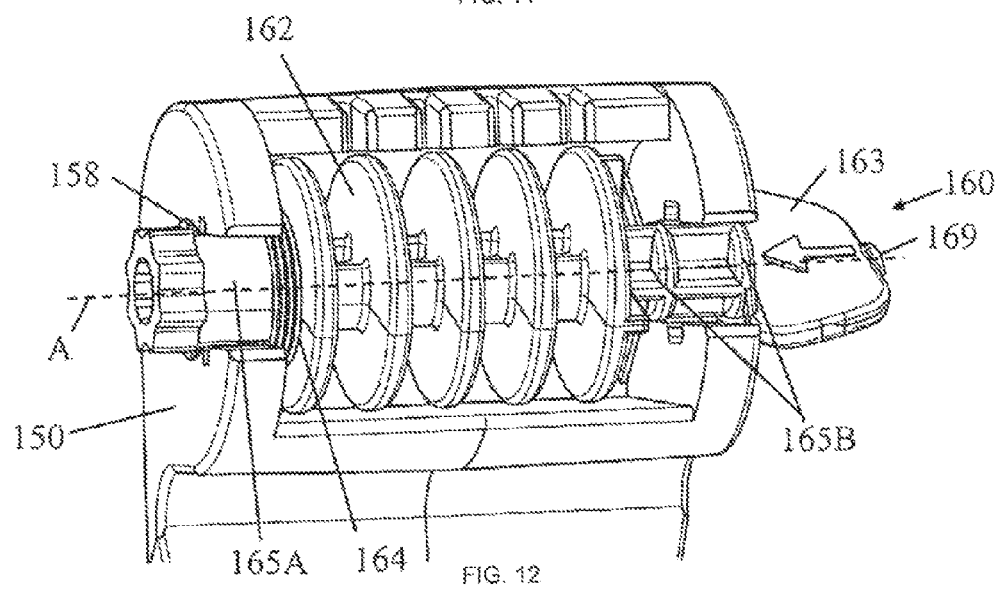
FIG. 12 is an isometric view of the body of FIG. 6 with a cover removed to show the spool biased to the unlocked position.

With reference to FIGS. 8, 11 and 12, cavity 152 provides space for adjustment mechanism 160 to mount within body 150. Cavity 152 includes an inner face 157, as indicated in FIG. 11. As shown in FIG. 8, body 150 defines a first bearing surface 158 and a second bearing surface 159 on which components of adjustment mechanism 160 may rotate. Body 150 further defines a tab 185 adjacent second bearing surface 159. As explained in more detail below, first bearing surface 158 defines latch teeth 184 that selectively engage adjustment mechanism 160 to selectively restrict adjustment mechanism from moving once body 150 is at a desired height relative to structure 44.

Figure 9:
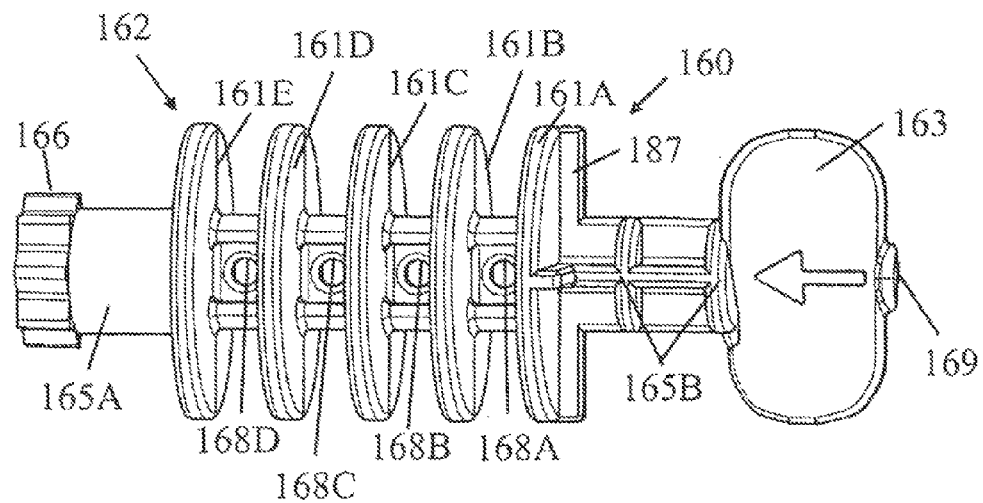
FIG. 9 is an isometric view of the spool of FIG. 7.
Figure 10:
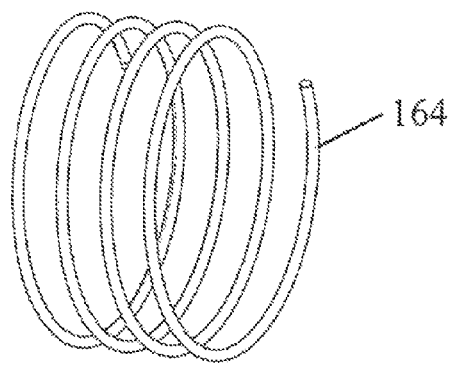
FIG. 10 is an isometric view of a biasing spring used to bias the spool into a locked position.

Shifting attention to FIG. 9, an adjustment mechanism 160 is shown. Adjustment mechanism 160 includes a spool 162, a handle 163 attached to spool 162, and spool teeth 166 attached to spool 162. Alternatively, handle 163 and spool teeth 162 may be defined by spool 162, being formed in spool 162 during a molding process. As shown in FIGS. 10 and 11, adjustment mechanism 160 further includes a rotation bias member 164.

Spool 162 allows lines 70 and 72 to wind around it, much like thread winds around a common sewing spool. Winding or unwinding lines 70 and 72 around spool 162 functions to change the position of body 150 relative to structure 44 when lines 70 and 72 are looped around corners of structure 44. Indeed, winding or unwinding the lines around spool 70 and 72 changes the length of the unspooled portion of lines 70 and 72 extending between the corners of structure 44 and spool 162 mounted within body 150.

As can be seen in FIG. 9, spool 162 defines flanges 161A-E and spool bearing surfaces 165A and 165B. Spool 162 further defines a tab 187 extending from flange 161A. The unique shape of bearing surfaces 165A and 165B shown in FIG. 9 is due to the molding process used to fabricate the spooling piece. Different bearing surface configurations, such as simple rounds, may be used if different fabrication processes are used, such as machining or casting.

Flanges 161A-E serve to keep the spooled lines 70 and 72 separated to reduce the risk of tangling. Spool 162 further defines holes 168A-D to which ends of lines 70 and 72 may attach, such as by threading the ends of lines 70 and 72 through holes 168A-D and tying each end of the lines into a knot with itself. Since each line 70 and 72 has two ends, there are four ends that may attach to holes 168A-D.

In some examples, spool 162 does not include holes and lines 70 and 72 are simply tied around spool without a hole. In other examples, lines 70 and 72 are attached to spool 162 with crimps, such as when lines 70 and 72 comprise a wire or a monofilament. Other methods of attaching lines 70 and 72 to spool 162 include using adhesive or capturing an end of the lines with an attachment feature defined by or connected to spool 162.

With reference to FIGS. 8, 11 and 12, bearing surfaces 165A and 165B of spool 162 are supported by bearing surfaces 158 and 159, respectively, of body 150 when mounted within cavity 152. Spool 162 is mounted within body 150 along an axis A. Bearing surfaces 158 and 159 of body 150 and bearing surfaces 165A and 165B of spool 162 allow spool 162 to rotate about axis A as well as to translate along axis A.

In the example shown in FIGS. 8, 11 and 12, spool 162 is configured to translate along axis A between a lock position (shown in FIG. 11) and a rotation position (shown in FIG. 12). In the lock position, locking teeth 166 are aligned with latch teeth 184, which causes locking teeth 166 and latch teeth 184 to intermesh and restrict spool 162 from rotating about axis A. Further in the lock position, tab 187 of spool 162 is aligned with tab 185 of body 150, which further restricts spool 162 from rotating. In the rotation position, bearing surface 150 is aligned with latch teeth 184 and first bearing surface 165, which causes bearing surface 150 to ride on first bearing surface 165 and enables spool 162 to rotate.

As shown in FIGS. 11 and 12, biasing member 164 biases spool 162 to the locked position. In the example shown in FIGS. 10-12, biasing member 164 comprises a compression spring. Biasing member 164 is positioned between inner face 157 and flange 161E and exerts biasing force upon them when compressed.

Biasing member 164 is not necessary to operate hanger 140 because the user could move spool 162 in and out manually. However, biasing member 164 provides a more elegant solution. Additionally or alternatively to a compression spring, the biasing member may comprise an extension, torsion, disc, urethane, tapered, or cantilever spring. In some examples (not shown), the biasing member is molded out of spool 162 or body 152, thus eliminating an extra component.

When spool 162 is in the locked position, body 150 is held in a fixed position relative to structure 44. Thus, when spool 162 is held in the locked position, body 150 can support an item at a fixed position relative to structure 44. When spool 162 is translated to the rotation position, spool 162 can rotate to wind or unwind string, which changes the position of body 150 relative to structure 44. By moving spool between the locked and unlocked positions, a user can adjust the position of the item relative to structure 44.

Handle 163 allows a user to translate spool 162 along axis A between the locked and rotation positions. Further, handle 163 allows a user to manually rotate spool 162 when the spool is in the rotation position. Generally, spool 162 will rotate freely to unwind the lines due to the weight of the item when in the rotation position unless the weight is counteracted by the user. To raise body 150 and the item relative to structure 44, a user may manually wind the lines around spool 162 by rotating spool 162 with handle 163.

As shown in FIGS. 11 and 12, handle 163 is defined by spool 162 and protrudes outside of body 150 when spool 162 is mounted within cavity 152. Alternately, handle 163 may comprise a separate piece that is attached to spool 162. Additionally or alternatively, handle 163 may include a hinge or be otherwise pivotally connected to spool 162 to enable it fold out for a more compact design.

In the embodiment shown in FIGS. 9, 11 and 12, handle 163 is shaped ergonomically to enhance the comfort of the user's fingers, but almost any shape may be used. Handle 163 includes a nub 169 at the end of handle 163, which provides a place for a user to press in or translate spool 162 along axis A. Nub 169 is raised from handle 163 to reduce friction between a user's finger and handle 163. Reduced friction allows spool 162 rotate more freely about axis A as spool 162 unwinds and lowers body 150. Nub 169 is an added enhancement to the functionality of the hanger 140, but is not necessary for its operation.

As shown in FIGS. 11 and 12, handle 163 may include or define a visual indicator, such as an arrow, to inform the user that handle 163 may be pressed inward to translate spool 162 along axis A. The arrow serves as an indicator to the user that handle 163 should be pressed inward (in the direction of the arrow) before the user is free to rotate handle 163. The arrow indicator is not critical for operation, but serves as added communication to the user. It could also be painted on or a secondary sticker could be affixed that would serve the same purpose.

Figure 13:
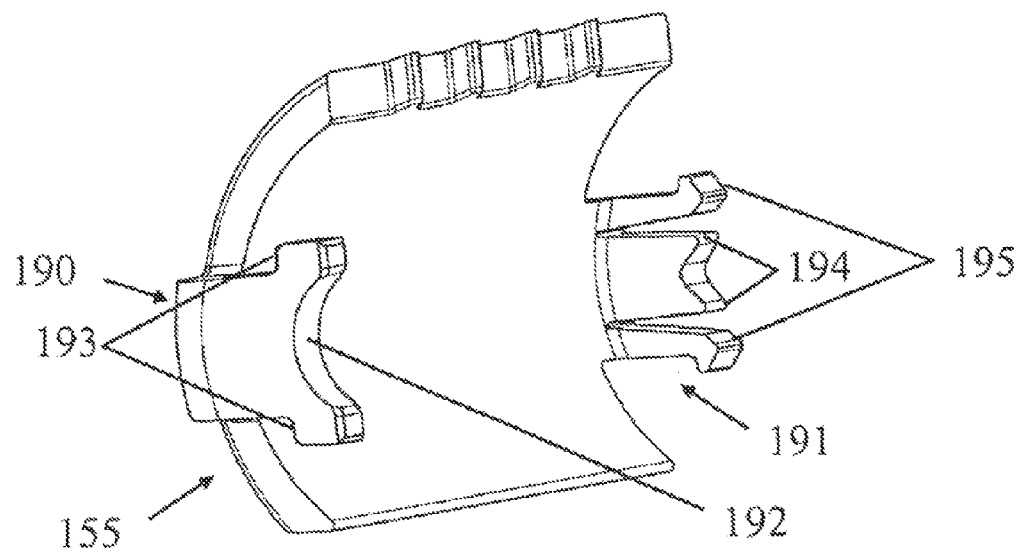
FIG. 13 shows an embodiment of a cover detached from the body of FIG. 6 and including a bearing surface.

With reference to FIG. 13, cover 155 functions to provide additional bearing surfaces to support motion of adjustment mechanism 160 and to contain adjustment mechanism within cavity 152. Cover 155 includes arms 190 and 191, which extend into cavity 152 when selectively attached to body 150. Arm 190 defines a bearing surface 192 and connectors 193. Arm 191 defines bearing surfaces 194 and connectors 195.

Additionally or alternatively to connectors 193 and 195 shown in FIG. 13, any form of connector known in the art may be used. For example, fasteners like screws, snaps, Velcro or adhesives may be used.

Figure 14:
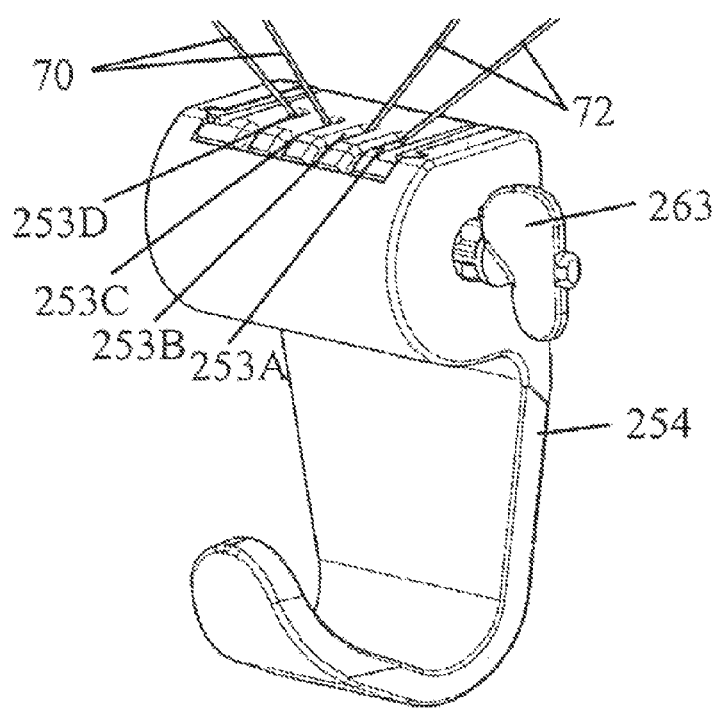
FIG. 14 is an isometric view of the hanger of FIG. 6 including alternative guide slots.

Shifting focus to FIG. 14, an alternative hook 254, alternative guide slots 253A-D, and an alternative handle 263 are shown. Instead of being defined by body 150, guide slots 253A-D are formed from a separate piece that attaches to body 150. To provide increased freedom of motion for lines 70 and 72, guide slots 253A-D extend toward the front or hook side of body 150 farther than do guide slots 153A-D. Alternative hook 254 and alternative handle 263 have different shapes that may make them more suitable for certain applications and more suitable for certain manufacturing techniques.

In operation, the user places lines 70 and 72 which are formed into loops, over corners 46 and 47 of structure 44. At this point, body 150 is suspended on structure 44; however, it may not be in the correct vertical position relative to structure 44. To adjust the position of body 150, the user presses handle 163 to translate spool 162 against the bias of bias mechanism 164 into the rotation position shown in FIG. 12.

When lowering body 150, the weight of body 150 and the item will tend to unwind lines 70 and 72 from spool 162 at a faster rate than will rotating spool 162 by hand if the user presses nub 169 to move spool 162 to the rotation position. However, a user may rotate spool 162 by hand with handle 165 to unwind lines 70 and 72 if desired. If the user desires to raise body 150 relative to structure 44, the user rotates spool 162 with handle 163 in a direction that winds up lines 70 and 72 around spool 162.

When body 150 is in the desired position, the user discontinues pressing spool into the rotation position to allow biasing mechanism 164 to translate spool 162 to the default locked position shown in FIG. 11. The item may be hung on body 150, such as on hook 154, either before or after the vertical adjustment.

Figure 15A:
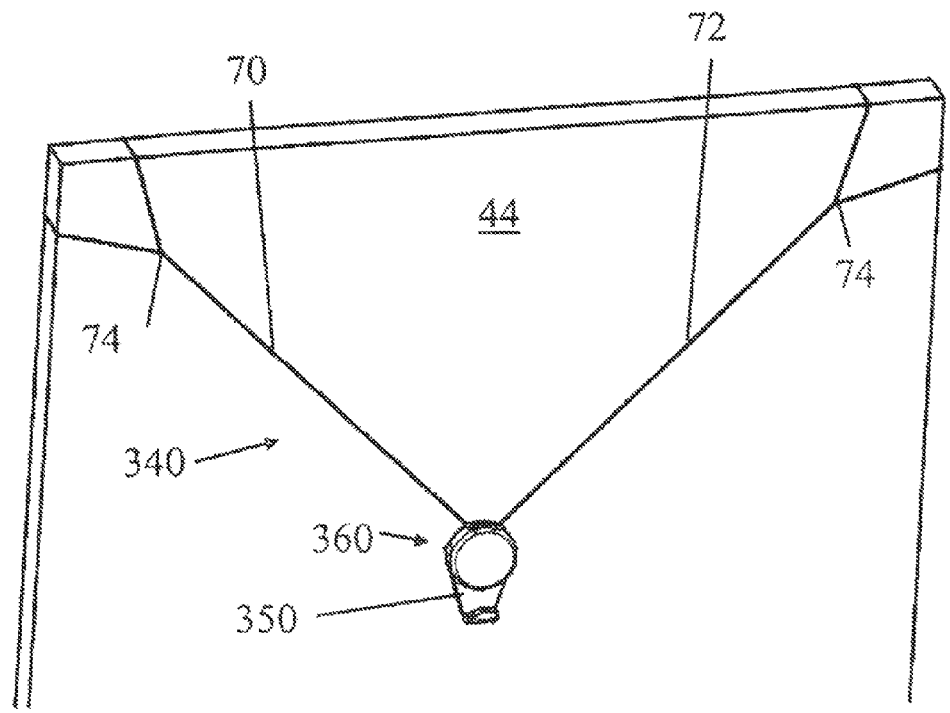
FIG. 15A is an isometric view of a third example of a hanger including a body configured to support an object and an adjustment mechanism, the adjustment mechanism being coupled to two lines.
Figure 15B:
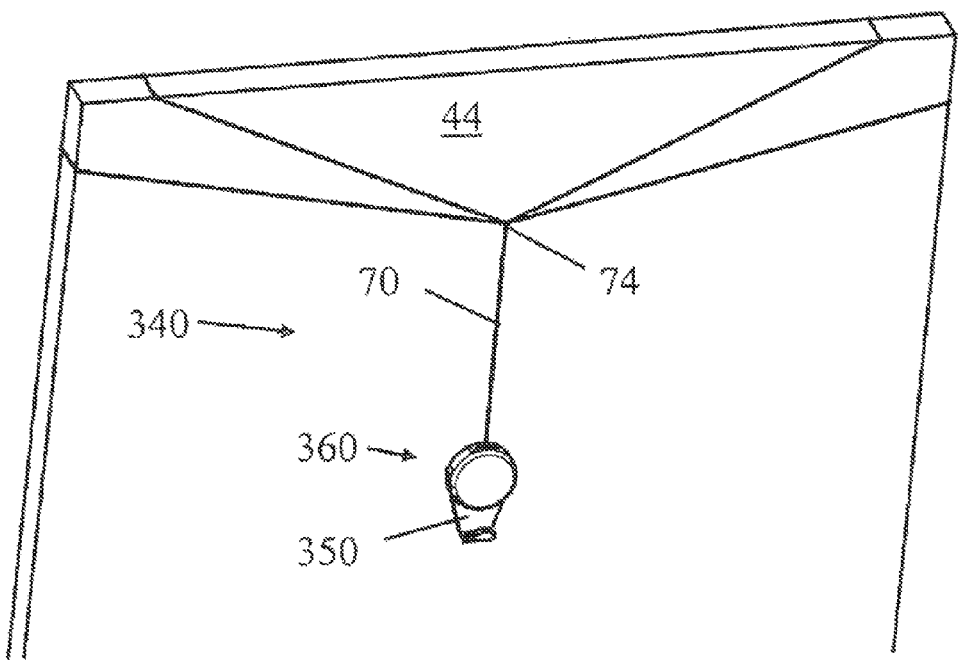
FIG. 15B is an isometric view of the hanger of 15A where the adjustment mechanism is coupled to a single line.

Turning attention to FIGS. 15A and 15B, a third example of a hanger, hanger 340, is shown. Hanger 340 functions to wind up one or more lines without the user having to wind them up. In the example shown in FIG. 15A, hanger 340 includes two lines, lines 70 and 72. In the example shown in FIG. 15B, hanger 340 includes a single line 70 formed into two loops with fastener 74. The components of hanger 340 are the same between FIGS. 15A and 15B except for how many lines are used. For the sake of brevity, FIG. 15A will be exclusively discussed below and features that are in common with or similar to features in prior hanger examples will not be described in duplicate.

As shown in FIG. 15A, hanger 340 includes lines 70 and 72, fasteners 74 binding the lines together to form loops, a body 350 receiving lines 70 and 72, and an adjustment mechanism 360 mounted within body 350. Hanger 340 also includes a lock mechanism 380 mounted within body 350.

Figure 16:
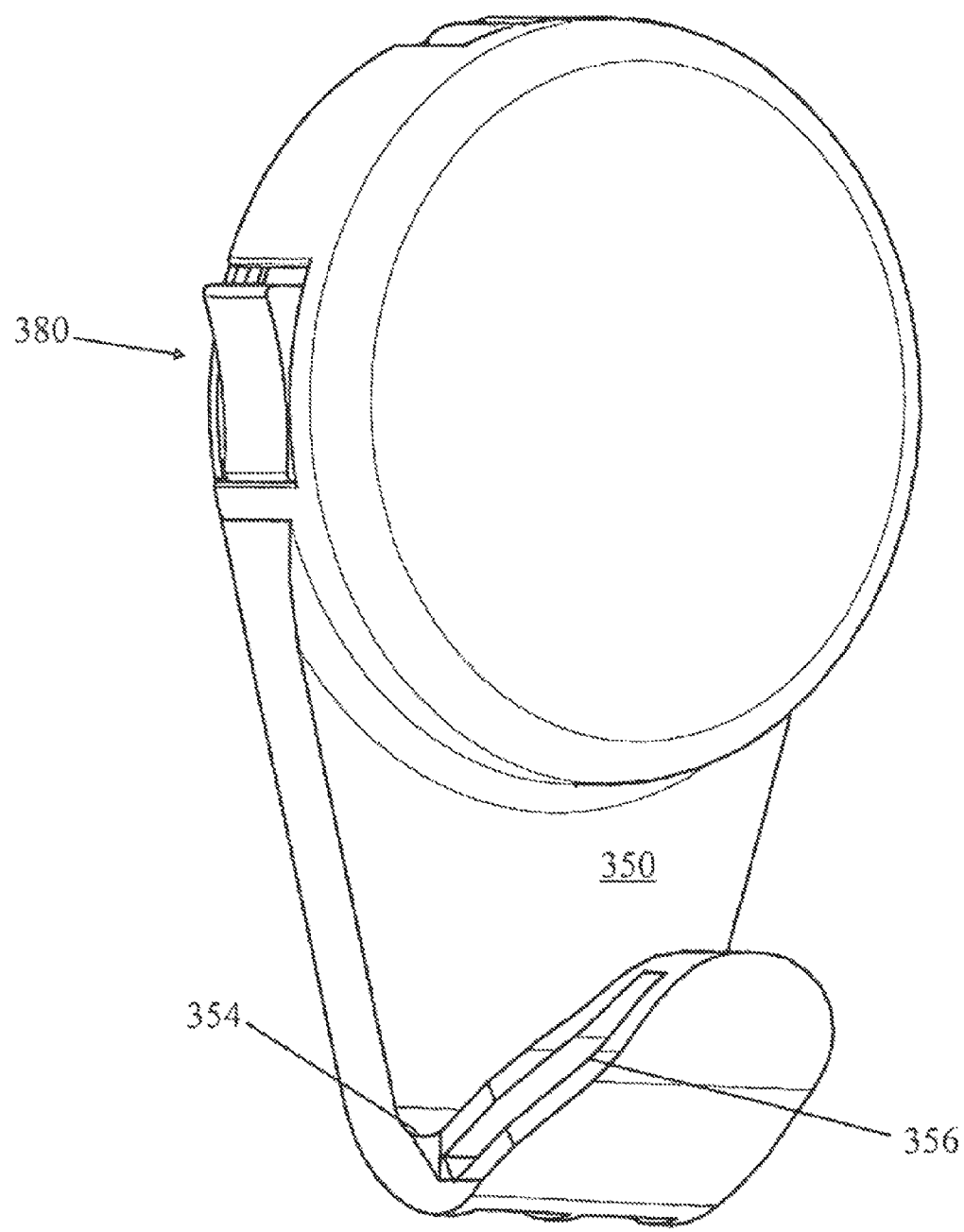
FIG. 16 is an isometric front view of the body of FIG. 15A supporting a latch and defining a hook.
Figure 17:
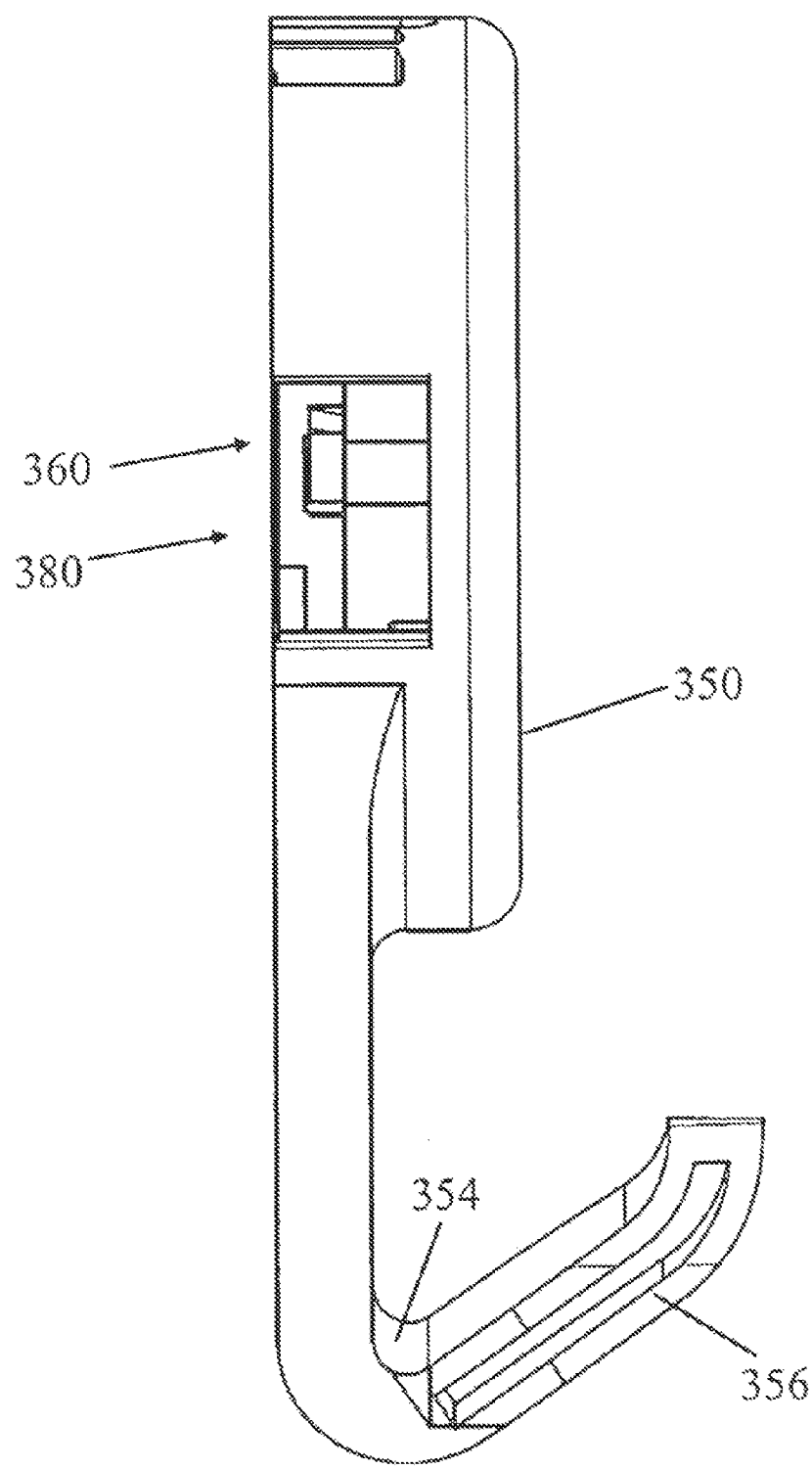
FIG. 17 is a side elevation view of the body of FIG. 15A.
Figure 18:
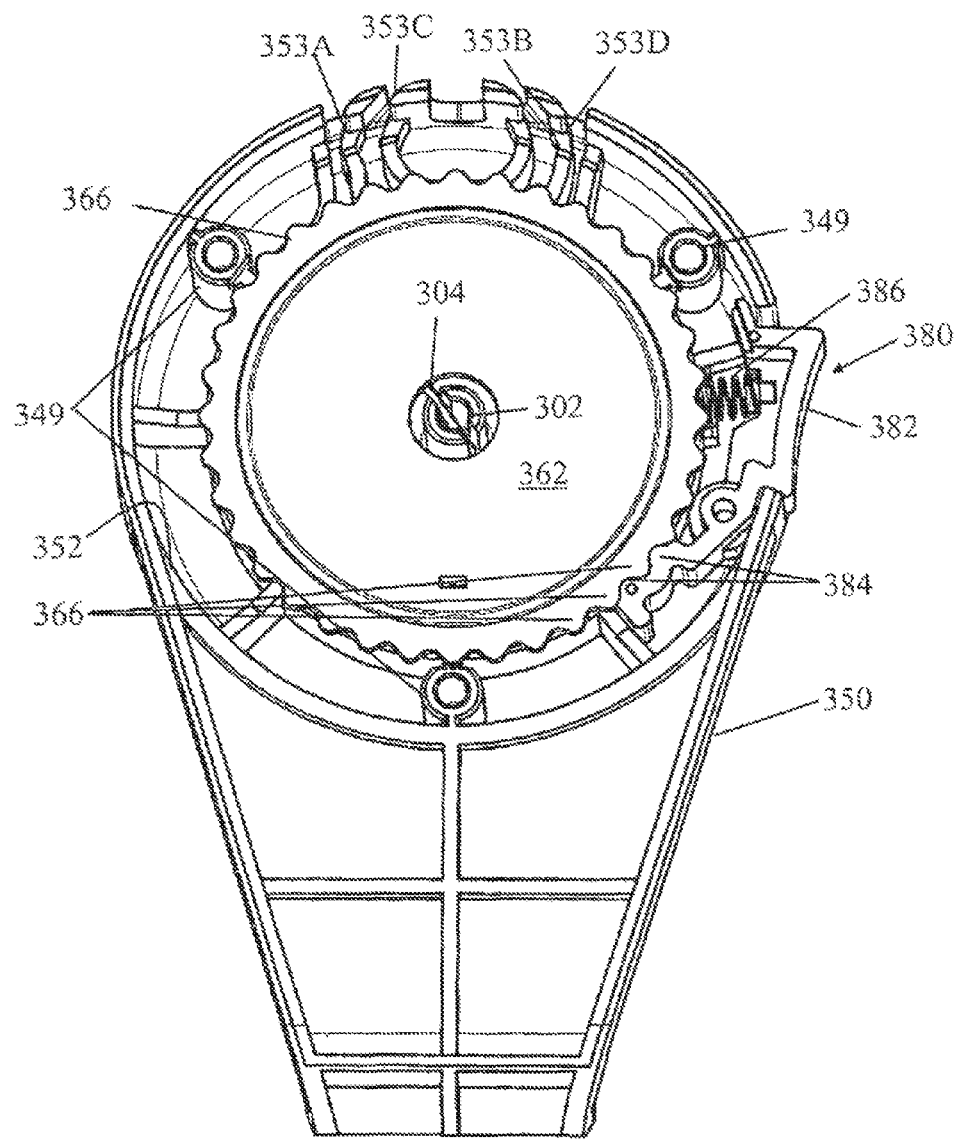
FIG. 18 is a back elevation view of the body of FIG. 15A with a cover removed to show a spool, a rotation bias member, a latch, and a lock biasing member.

As can be seen in FIGS. 16 and 18, body 350 defines a hook or a J-shaped area 354 onto which the object to be hung may be placed. Item 42 can either be hung directly onto hook 354 or another piece of material can be suspended from hook 354 and attached to item 42. For example, the piece of material could be a loop of ribbon or string coming off the top of an item, such as a wreath.

Body 350 further defines ribs 356 that provide structural rigidity to body 350. Ribs 356 allow body 350 to be stronger without an increase in the nominal wall thickness of the material used to form body 350. Ribs 354 are not functional in nature, since the same result can be achieved by using a thicker, non-ribbed section, but ribs 356 allow for material saving and decrease the likelihood of warping in the injection molding process. Also, while body 350 is shown as an injection molded plastic piece, it could also be constructed of metal, wood, composites, or other materials. The specific design may differ slightly when accommodating different manufacturing processes, but the function would be the same.

Figure 19:
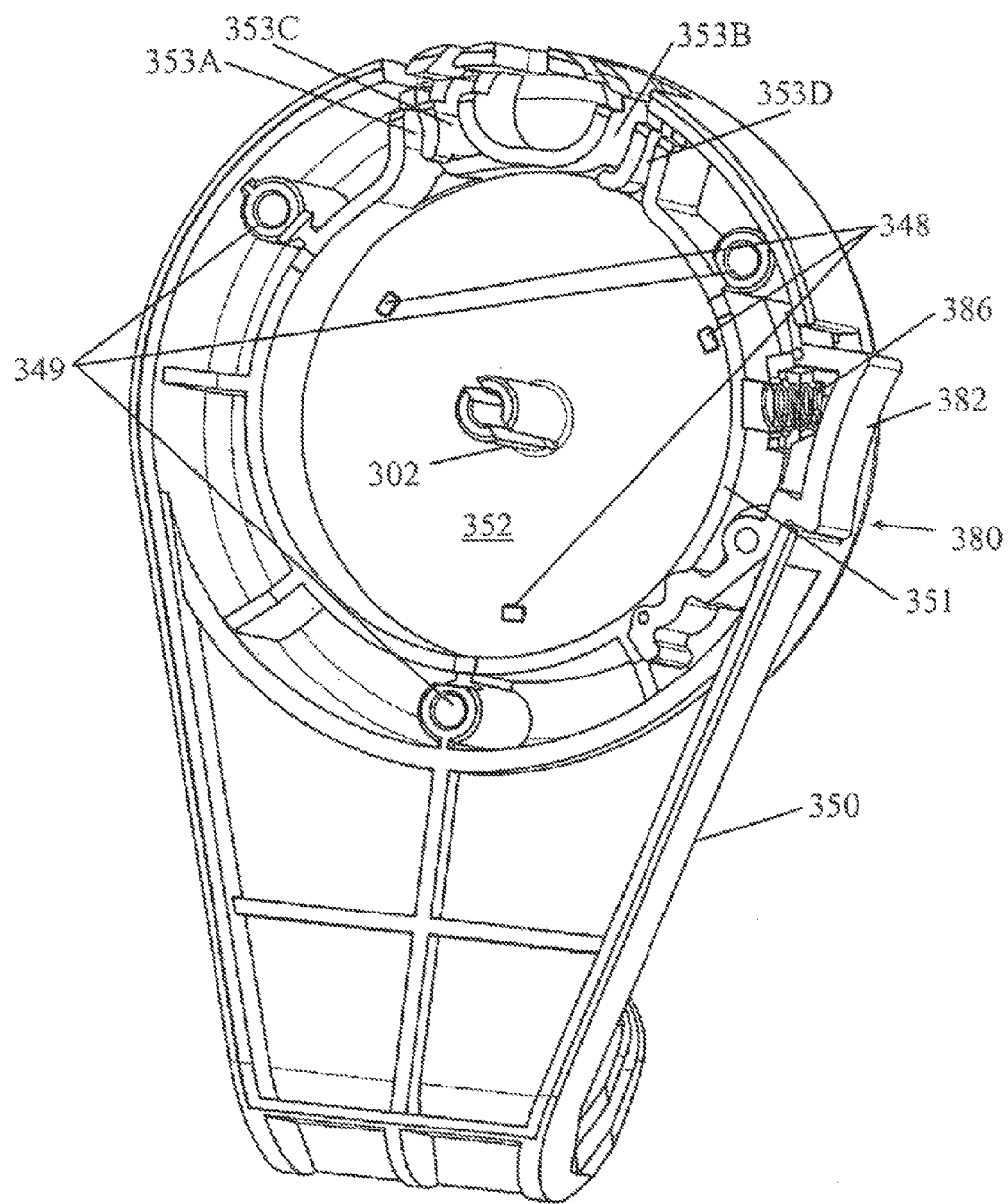
FIG. 19 is a back isometric view of the body of FIG. 15A with a cover and the spool removed to show the cavity and structure defined by the body.

As shown in FIGS. 18 and 19, body 350 defines a cavity 352 for housing adjustment mechanism 360 and lock mechanism 380. Within cavity 352, body 350 defines circular ribs 351, which bound a portion of cavity 352 directed to housing a spool 362 of adjustment mechanism 360. Circular ribs 151 serve as bearing areas for an outer periphery or circumference of spool 362 when it rotates.

Body 350 further defines raised bearing surfaces 348 for a face of spool 362. In some examples, bearing surfaces comprise a single raised bearing area ring rather than discrete surfaces. It should be noted that hanger 340 would still function without bearing pads 348, but the ease at which spool 362 rotates may be affected.

As shown in FIGS. 18 and 19, body 350 defines line guidance slots 353A-D, which guide lines 70 and 72 to adjustment mechanism 360. Note that while four slots are shown, only two slots are needed when fasteners 74 are used to form lines 70 and 72 into loops. Only two slots are needed because only a single end of lines 70 and 72 enter body 350 when fasteners 74 form loops in each of lines 70 and 72. In some examples, body 350 defines a single slot to guide all the lines entering body 350. Moreover, in some examples, body 350 does not define any line-guidance features.

Figure 23:
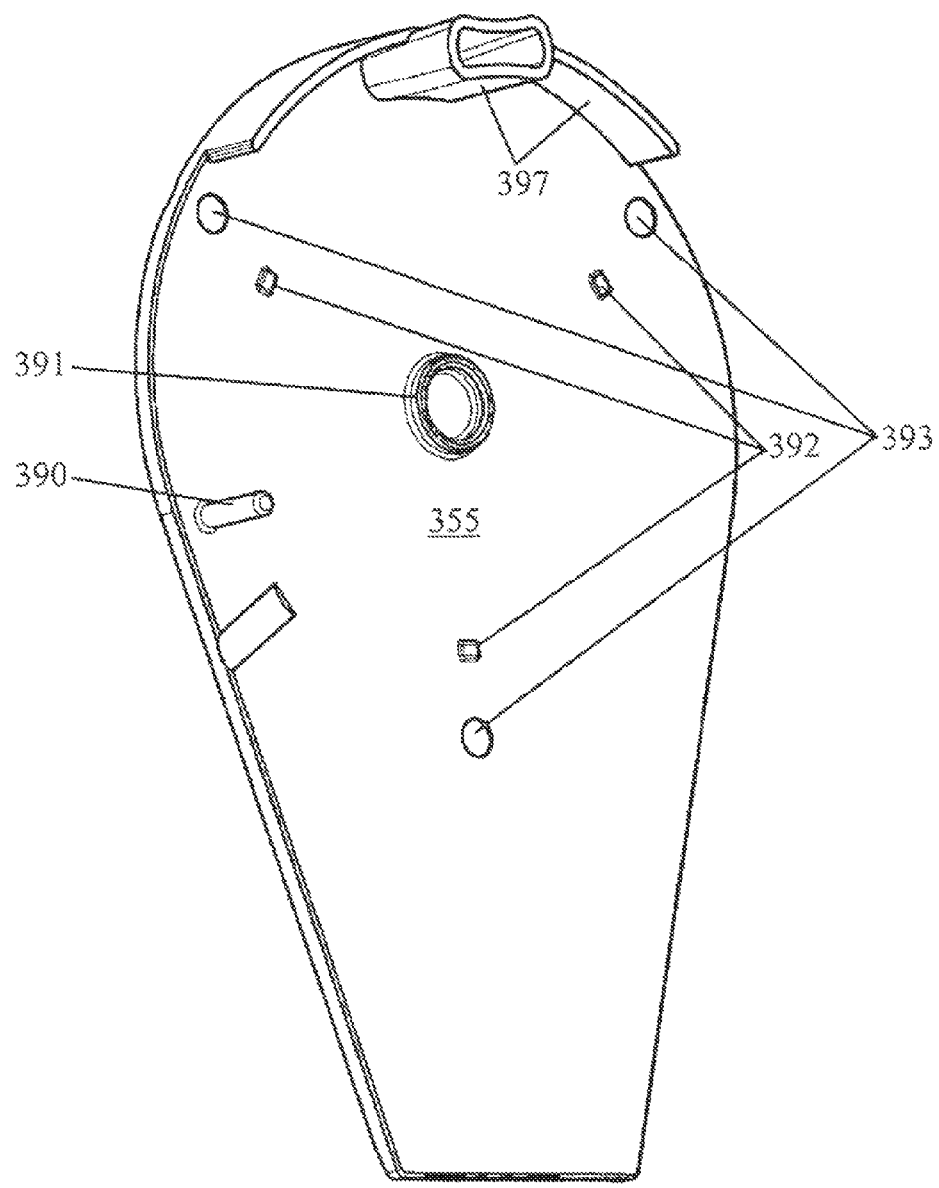
FIG. 23 is a back isometric view of a cover that may be used with the body of FIG. 16.
Figure 24:
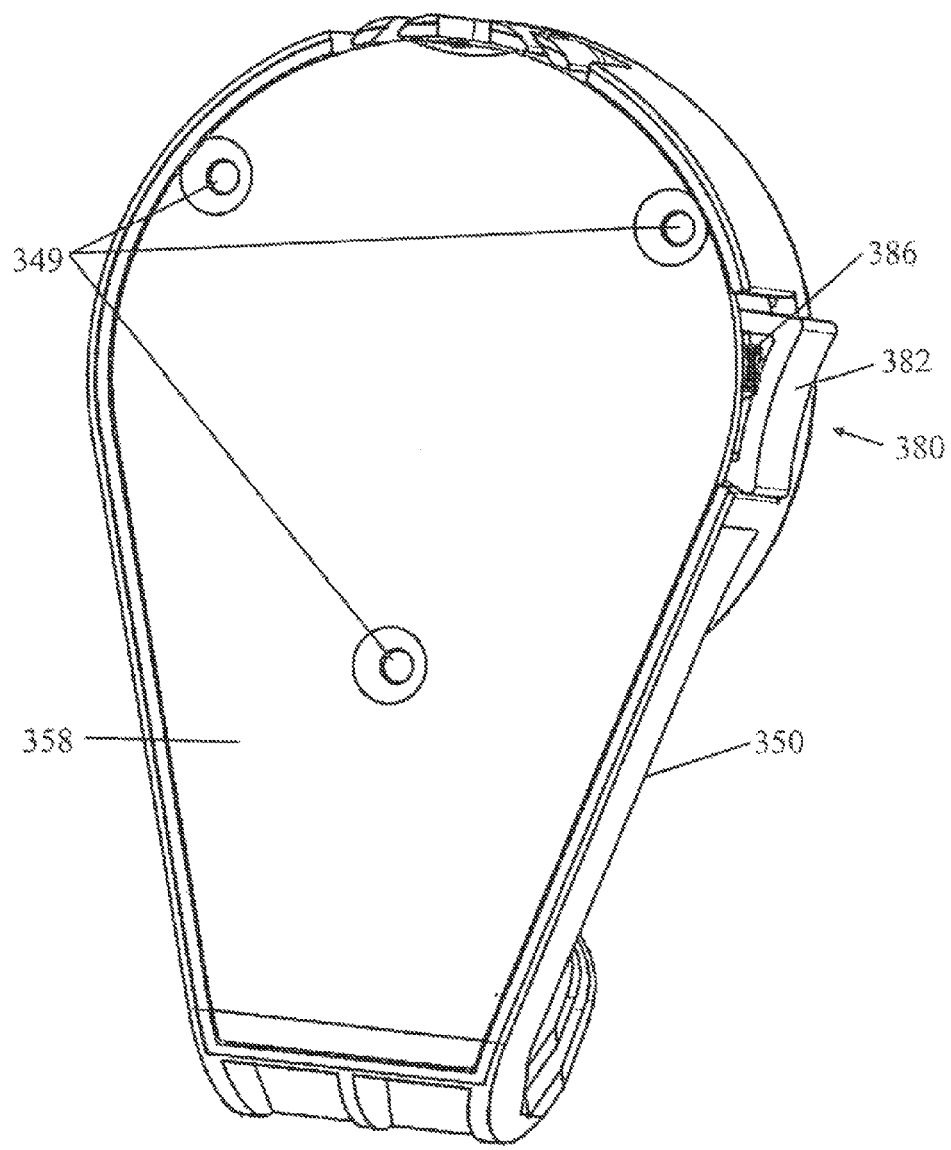
FIG. 24 is a back isometric view of the body of FIG. 16 with a cover in place and fasteners removed from fastener holes.

With continued reference to FIGS. 18 and 19, it can be seen that body 350 defines screw bosses 349. Screw bosses 349 allow for a cover 355, which is shown in FIGS. 23 and 24, to be secured to the back of body 350, such as with screws. It is important to note that the number of screw bosses is not important, and that cover 355 need not be secured to body 350 with screws. For example, cover 355 may be joined to body 350 with adhesive, rivets, ultrasonic welding, or snap features.

Further, as shown in FIGS. 18 and 19, body 350 defines an anchor 302 to which a rotation bias member 364 of adjustment mechanism 360 attaches. As explained in more detail below, rotation bias member 364 may comprise a spring, such as a power spring or a negator spring. Anchor 302 serves to hold one end of the spring to enable it to coil up when stretched.

Figure 21:
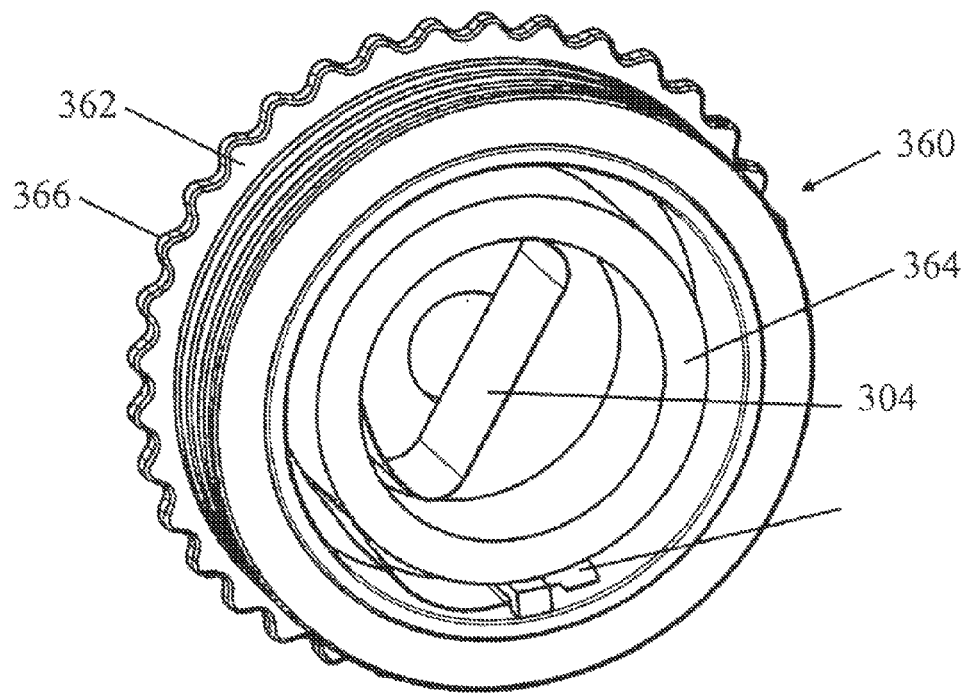
FIG. 21 is a back isometric view of the spool and the rotation bias member of FIG. 18.
Figure 22:
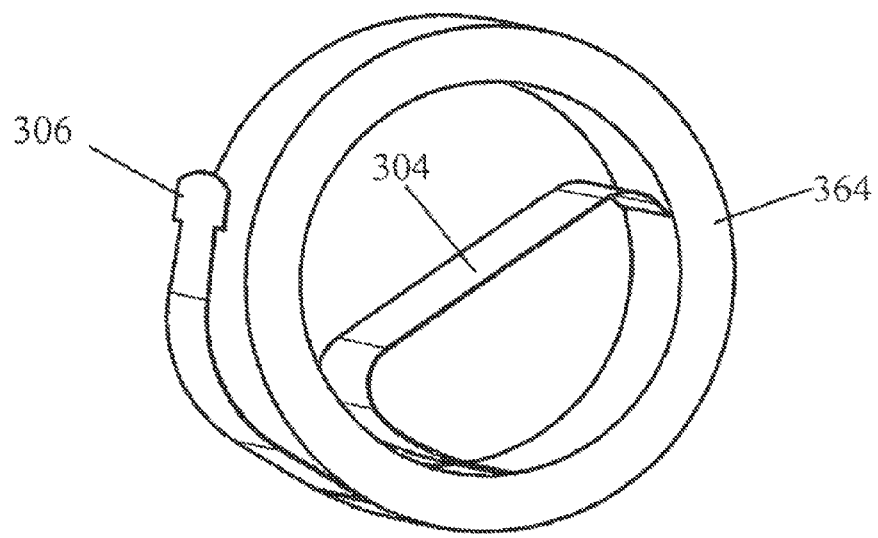
FIG. 22 is a simplified view of negator spring that may be used in the rotation bias member of FIG. 18.

With reference to FIGS. 18, 21 and 22, adjustment mechanism 360 includes spool 362 rotatably mounted to body 350 in cavity 352. Adjustment mechanism 360 also includes a rotation bias member 364 coupled to spool 362 at an outside end 306 and coupled to anchor 302 at an inner end 306. As with adjustment mechanism 160, adjustment mechanism 360 enables the height of body 360 relative to structure 44 to be adjusted by winding and unwinding lines 70 and 72 around spool 362. Rotation bias member 364 serves as an energy storage device and allows spool 362 to selectively wind up lines 70 and 72 without requiring the user to manually rotate spool 362.

Figure 20:
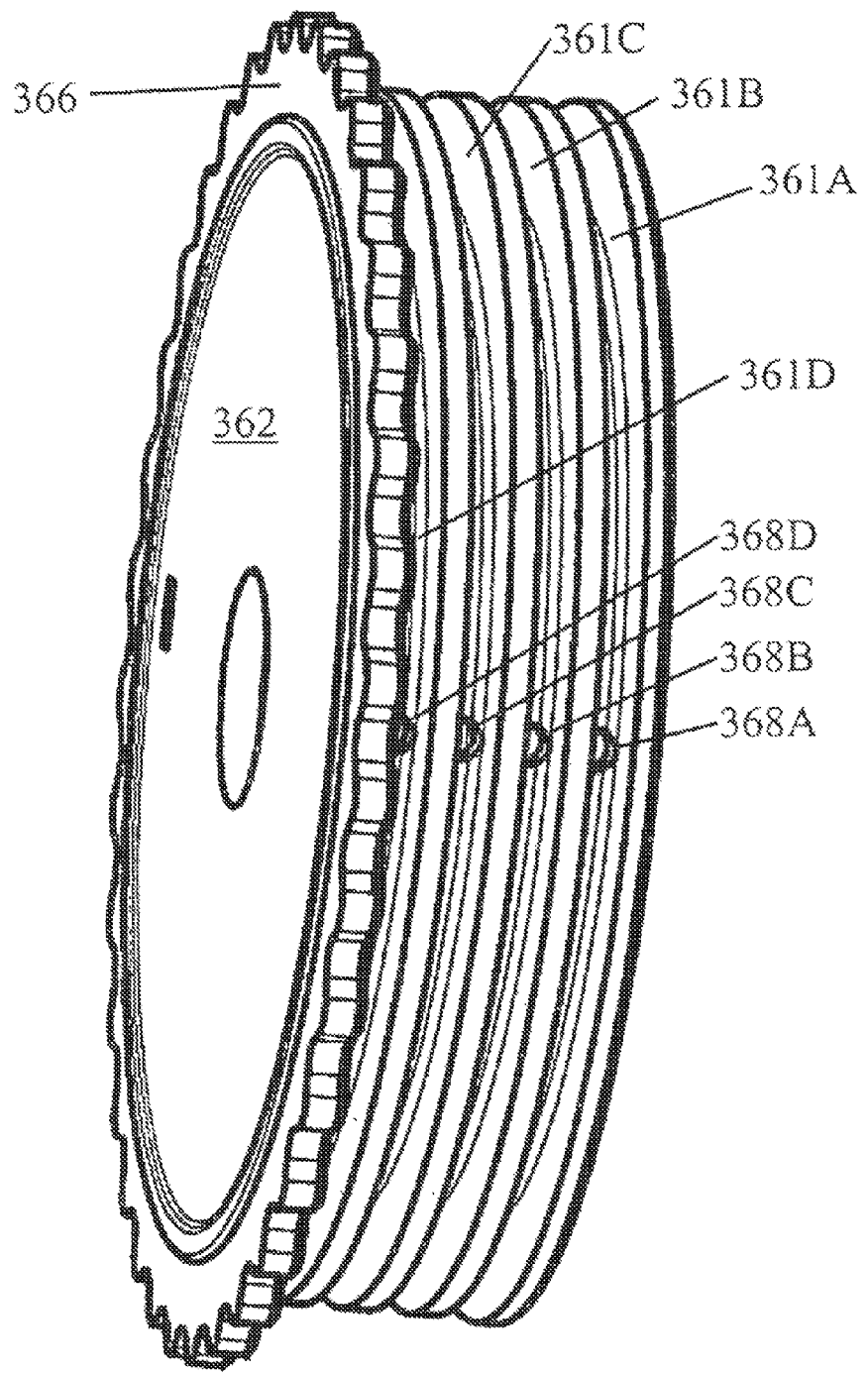
FIG. 20 is a side isometric view of the spool of FIG. 18.

With reference to FIGS. 18, 20 and 21, spool 362 includes spool teeth 366 oriented along a first circumference of spool 362. Moreover, spool 362 defines grooves 361A-D along a second circumference of spool 362. Spool 362 may rotate clockwise and counter-clockwise to either wind or unwind the lines around spool 362.

As shown in FIG. 20, groves 361A-D define holes 368A-D to which lines 70 and 72 may couple or fasten. Line guidance slots 353A-D guide lines 70 and 72 to grooves 361A-D and to holes 368A-D, respectively. With lines 70 and 72 secured to holes 368A-D, rotating spool 362 causes lines 70 and 72 to wind around spool 362 in grooves 361A-D.

Grooves 361A-D keep the spooled lines separated to reduce the risk that the lines will become tangled. While spool 362 shown in FIG. 20 includes four grooves, two grooves suffice when only one end of each line 70 and 72 couples to spool 362. In some examples, body 350 defines a single groove and in some examples body 350 does not define grooves.

With reference to FIGS. 18, 21 and 22, rotation bias member 364 extends between inner end 304 and outer end 306. Rotation bias member 364 may comprise a power spring, or as it is sometimes referred, a negator spring. Power or negator spring used in hanger 340 may be similar or identical to springs often found in common tape measures. It should be noted that the rotation bias member may additionally or alternatively comprise other types of springs or stored energy devices.

As shown in FIG. 21, rotation bias member 364 mounts inside spool 362. Outside end 306 of rotation bias member 364 attaches to spool 362. Inside end 304 of spool 362 is attached to anchor 302, as previously mentioned. As spool 362 rotates in a direction that stretches rotation bias member 364, rotation bias member 364 winds up and stores energy. When released, the stored energy causes spool 362 to rotate in an opposite direction.

Note that the reverse configuration, with outside end 306 attached to anchor 302 and inside end 304 attached to spool 362 would also work. However, certain features of body 350 would ideally then be modified. In some examples, rotation bias member 364 is coupled elsewhere to body 350 or to back plate 355.

FIG. 22 shows a power or negator spring by itself in simplified form. That is, the geometry of the power or negator spring is depicted as solid cylinder, whereas, in actuality, it is a thin metal tape that is wound many times around itself. While outside end 306 in FIG. 22 includes a mushroom-like shape to help it attach to spool 362, the mushroom shape is not required. Indeed, outside end 306 may have many other geometries and function properly. Further, outside end 306 could attach to spool 362 via rivets, screws, snaps, or adhesives.

As explained in further detail below, spool teeth 366 interface with a lock mechanism 380 to selectively restrict spool 362 from rotating. In the examples shown, spool teeth 366 are located on the circumference of spool 362 for increased mechanical advantage, but in other examples, the spool teeth are located more toward the center of spool 362. Spool teeth 366 may define a tooth slope or interface angle 3.67, which represents the slope between peaks and valleys of individual teeth in spool teeth 366.

Tooth slope 367 may be selected to cause spool teeth 366 to slip in their interface with lock mechanism 380 when subject to a predetermined shear force. This type of slippage is also sometimes referred to as ratchet action. As explained below, the shear force experienced by spool teeth 366 is related to the weight of an item. Intentionally causing spool teeth 366 to slip when hanger 340 attempts to support a given load can help reduce the risk that spool 362 or other components of hanger 340 will become damaged.

Turning attention to FIG. 23, cover 355 and its components are described in further detail. Cover 355 retains spool 362 within cavity 352 and hides internal components of hanger 340 from view for aesthetic purposes. Cover 355 defines a center boss 391 for stabilizing anchor 302 by limiting it from bending too much and possibly breaking during use.

Moreover, cover 355 defines three bearing pads 392, which are similar to bearing pads 348. Like bearing pads 348, bearing pads 392 may exist in any number and may exist as a single ring. Bearing pads 392 reduce the contact area between spool 362 and cover 355 to reduce friction. However, as bearing pads are not necessary for proper functioning of hanger 340, in some examples, the cover does not define bearing pads.

Cover 355 shown in FIG. 23 further defines fastener holes 393 for passage of fasteners, such as screws, through cover 355 to body 350 to fasten cover 355 to body 350. Top ribs 397 are defined by cover 355 and help guide lines 70 and 72. Top ribs 397 are not included in certain examples. Cover 355 further defines a post 390, which serves as a pivot for a latch 382, as described in more detail below. While post 390 is shown as a protrusion in FIG. 23, in some examples the cover defines a recess into which a post defined by body 350 or included in lock mechanism 380 may insert.

As shown in FIGS. 16-19, hanger 340 includes lock mechanism 380 for selectively restricting spool 362 from rotating. Lock mechanism includes a latch 382 mounted to body 350 adjacent spool 362 and a lock bias member 386 mounted between latch 382 and body 350. As shown in FIGS. 16-19, latch 382 extends outside of body 350 in a position accessible to a user for being selectively moved by a user.

Figure 25:
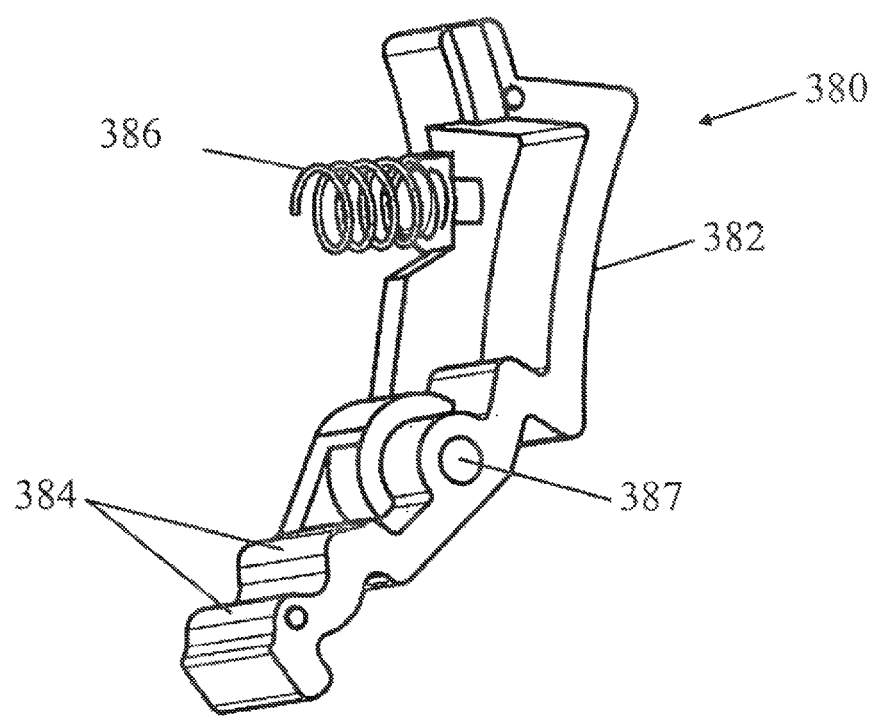
FIG. 25 is an isometric view of the latch if FIG. 18 and a lock biasing member.
Figure 27:
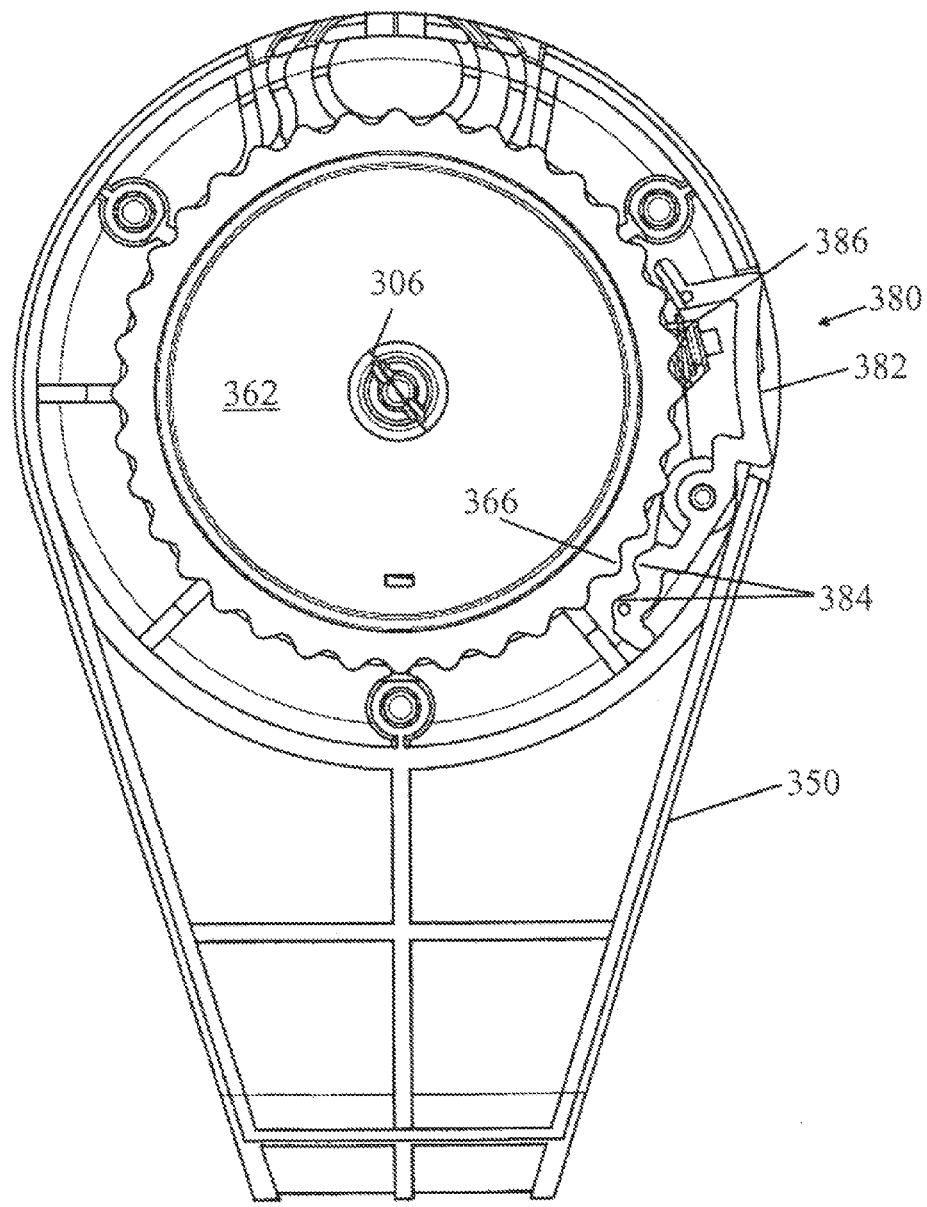
FIG. 27 is a back elevation view of the body of FIG. 16 with the cover removed to show the latch disengaged from the spool.

With reference to FIGS. 18, 25 and 27, latch 382 defines latch teeth 384, which face spool teeth 366 of spool 362. Further, latch 382 defines a cylindrical bearing 387 configured to receive post 390 to enable latch 382 to pivot around post 390. Latch teeth 384 selectively engage or intermesh with spool teeth 366 when latch 382 pivots about post 390 such that latch teeth 384 are moved into contact with spool teeth 366. In the example shown in FIGS. 18, 25 and 27, latch 382 is biased by lock bias member 386 to pivot latch teeth 384 into intermeshing contact with spool teeth 366.

When latch teeth 384 engage or intermesh with spool teeth 366, spool 362 is restricted from rotating. In this locked position, shown in FIG. 18, the lines 70 and 72 are restricted from winding or unwinding around spool 362 because spool 362 is restricted from rotating. When a user presses latch 382 toward cavity 352 against the bias of lock bias member 386, latch 382 pivots latch teeth 384 away from spool teeth 366.

This causes latch teeth 384 to separate from or disengage spool teeth 366, thus allowing spool 366 to rotate.

In FIGS. 18, 25 and 27, lock bias member 386 is a compression spring. In other examples, the lock bias member comprises a torsion spring, an extension spring, a leaf spring, or a plastic molded spring, which could be part of latch 382 itself. Factors including the expected life of the lock bias member over varying temperatures and the subjective feel of it to the user will influence the type of spring chosen.

In some examples, the lock bias member and the latch are formed of a metal that has both spring characteristics and teeth-like features. In these examples, the teeth slope chosen may be more severe to limit or prevent ratcheting or intentional slip of the latch teeth relative to the spool teeth. Ratcheting or slip may be unnecessary if the metal parts are unlikely to break under heavy load.

Figure 26:
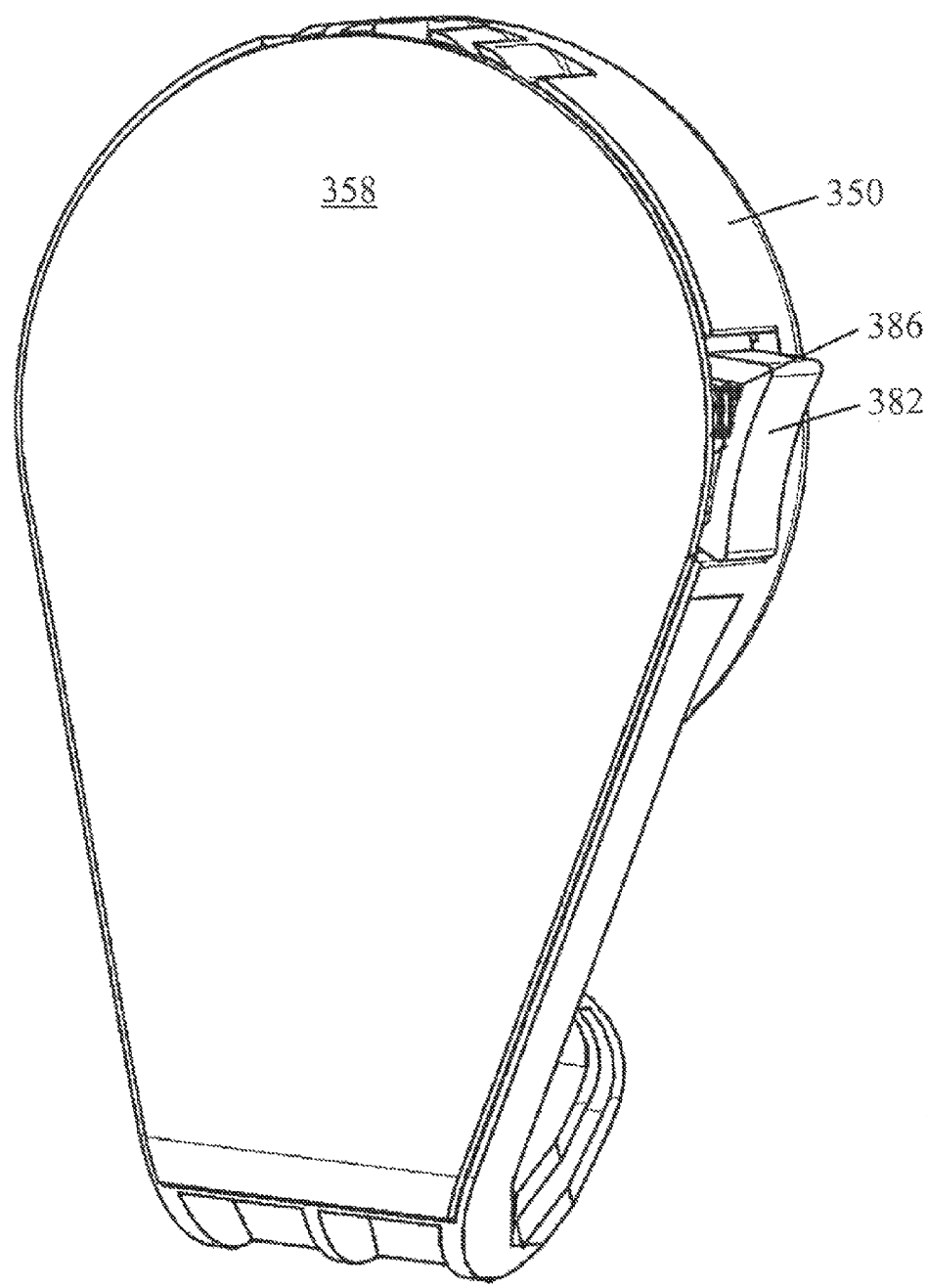
FIG. 26 is an isometric back view of the body of FIG. 16 with a backing material added to the back.

As shown in FIG. 26, a backing material 358 may be attached to or defined by cover 355. Backing material 358 hides fastener holes 349 and could be made from a non-marring material. The non-marring material is applied to limit or reduce structure 44, such as a door, from becoming marred or otherwise damaged by body 350. In some examples, backing material 358 has a high coefficient of friction so that body 350 is more likely to stay in place once adjusted to the desired height. Silicon is one example of a suitable backing material having a high coefficient of friction. Backing material 358 may be attached to cover 355 in a variety of ways, such as with the use of adhesive, mechanical snaps, or over-molding on cover 355 itself.

One example of operating hanger 340 to hang an item is provided; though, many other variations are contemplated. A user places loops of lines 70 and 72 over the corners of door 44. At this point, hanger 340 is suspended on door 44; however, it may not be in the correct vertical position. To adjust the position of body 350, the user presses latch 382 into body 350. FIG. 18 shows hanger 340 in a locked position, which is the default. FIG. 27 shows hanger 340 in a rotation position, which would occur after a user presses latch 382 inwards. In the rotation position, latch teeth 384 are no longer in contact with spool teeth 366, which allows spool 362 to rotate freely.

When spool 362 can rotate freely, lines 70 and 72 can either unwind, lowering body 350, or wind up further, raising the height of body 350. The rotation bias member is loaded in such a way that it rotates spool 362 in the direction that will wind up lines 70 and 72. This means that as body 350 is moved upward, lines 70 and 72 are wound further around spool 362 and they stay taut relative to the corners of door 44.

Once body 350 is in the user's desired location, the user simply stops pressing on latch 382. Lock biasing member 386 then pushes latch 382 back into the locked position. If the crest of the latch teeth 384 hit the crest of the spool teeth 366, it could lead to a condition where the teeth are not fully seated in one another. However, the weight of an item hung on body 350 will cause spool 362 to rotate enough such that the crest of the latch teeth 384 come into contact with the trough of spool teeth 366, thus forcing latch 382 into the fully-seated, locked position. The item may be hung on hanger 340 either before or after body 350 is adjusted vertically.

Figure 28:
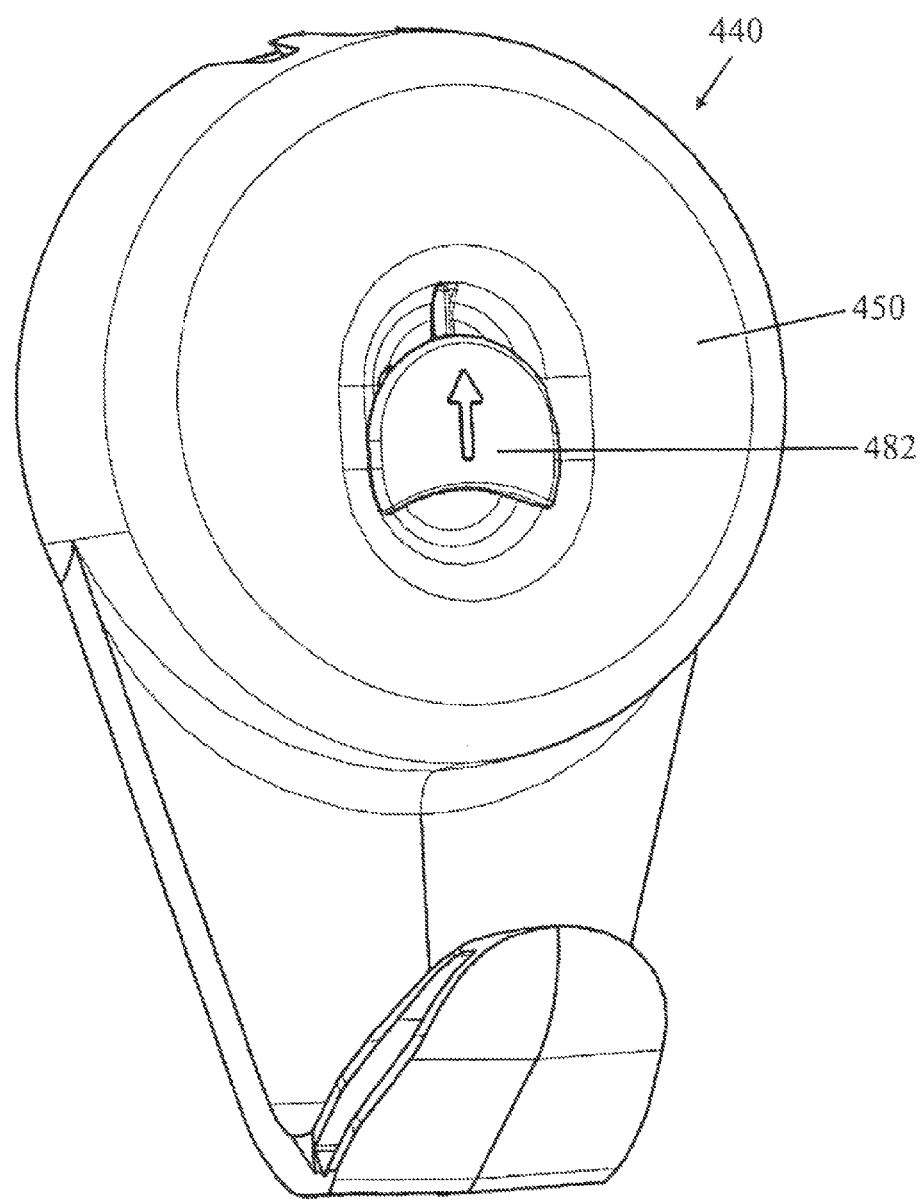
FIG. 28 is a front isometric view of a fourth example of a hanger, the hanger including body, an adjustment mechanism, and a sliding latch.
Figure 29:
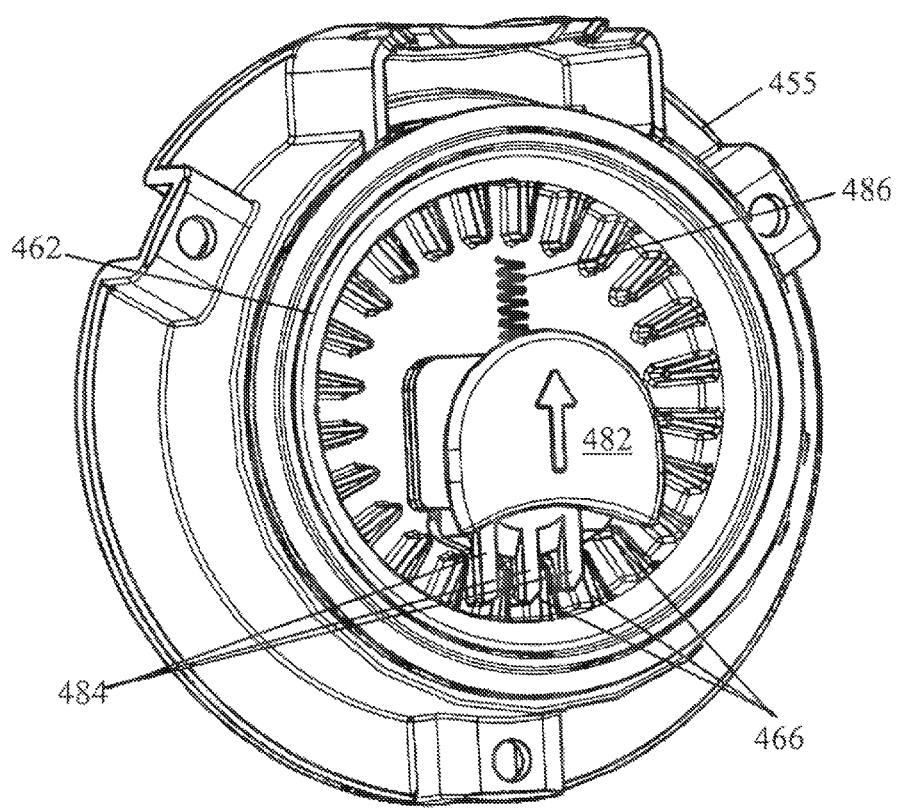
FIG. 29 is a back isometric view of the body of FIG. 28 with a cover removed to show the latch engaging a spool.

Turning attention to FIGS. 28 and 29, an example of an alternative hanger, hanger 440, is discussed. As hanger 440 is similar to hanger 340 in many respects, only a brief description of the different components will be provided. Hanger 440 includes a latch 482 that is slidingly mounted to a body 450. As shown in FIG. 29, latch teeth 484 engage with spool teeth 466, which are defined by spool 462. Spool 462 is housed in cover 455 rather than in body 450. Cover 455 has a more intricate geometry than cover 355 and includes line guidance features.

Similar to hanger 340, latch teeth 482 are biased by a lock bias member 486 to engage spool teeth 466 in full contact. Spool 462 is free to rotate once the user slides latch 482 out of the way of spool teeth 466. At that point, the height of the device can be moved up and down until latch 482 is released, which allows lock bias member 486 to push latch 482 back to the default, locked position.

Figure 30:
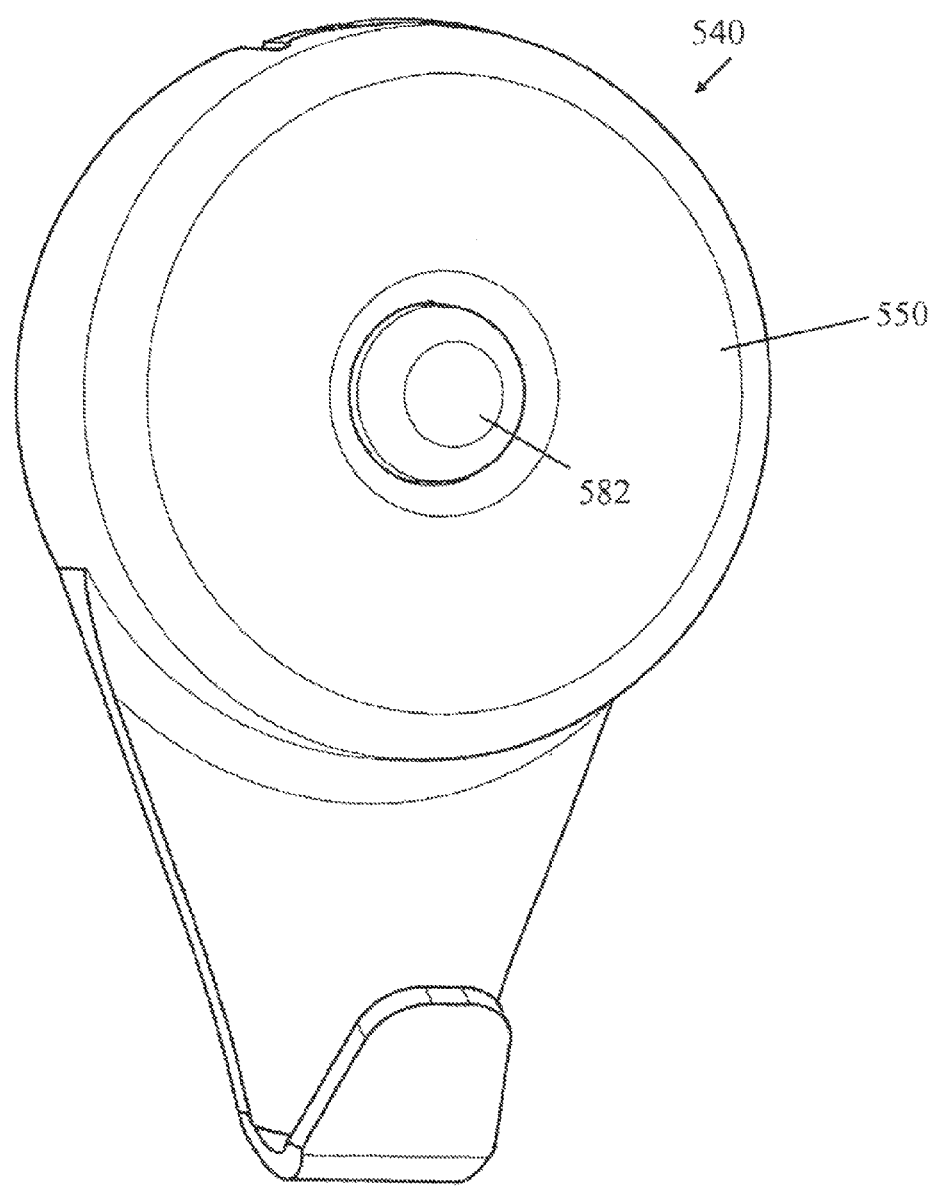
FIG. 30 is a front isometric view of a fifth example of a hanger, the hanger including body, an adjustment mechanism, and a push button latch.
Figure 31:
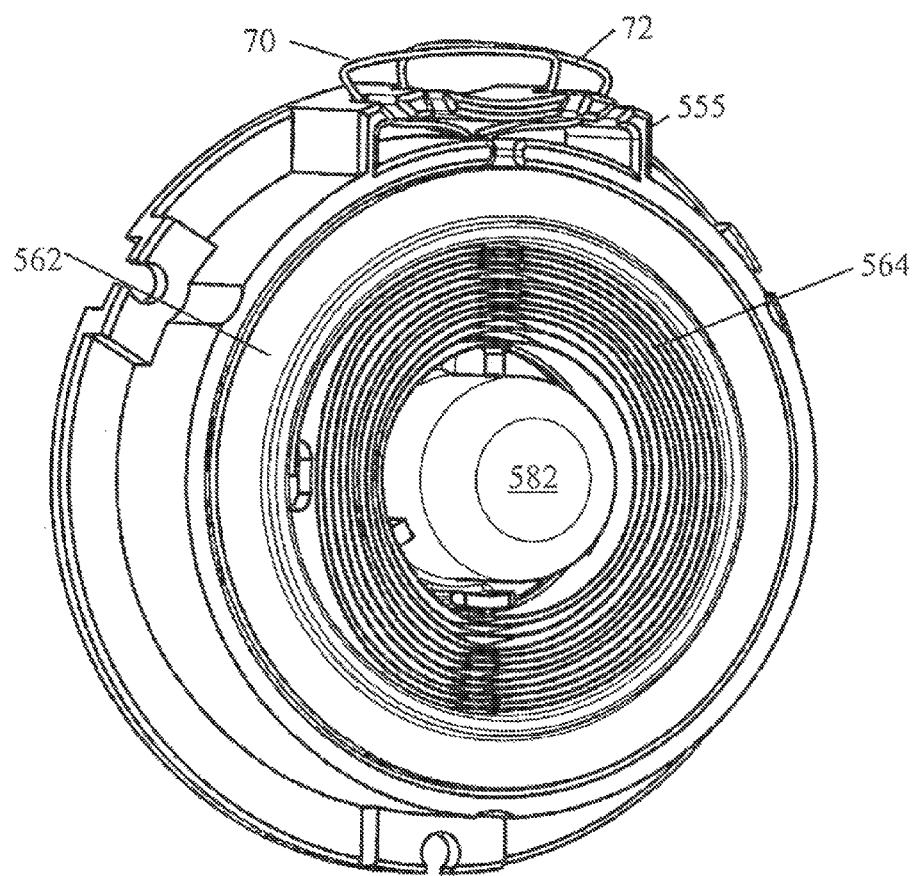
FIG. 31 is a front isometric view of the body of FIG. 30 with a cover removed to show a rotation bias mechanism.

Shifting focus to FIGS. 30 and 31, an example of an alternative hanger, hanger 540, is discussed. As hanger 540 is similar to hanger 340 in many respects, only a brief description of the different components will be provided. Hanger 540 includes a latch 582 that is a push button in the center of body 550. Latch teeth on latch 582 and spool teeth on a spool 562 engage to lock and unlock, although they are not shown in FIGS. 30 and 31 since they are on the back side of spool 562. A rotation bias member 564 comprising a power or negator spring is shown with a geometry that is more representative of an actual power spring than in the previous figures. Lines 70 and 72 are also shown in a retracted position. Cover 555 has a more intricate geometry than cover 355 and includes line guidance features.

Similar to hanger 340, the latch teeth of hanger 540 are biased by a lock bias member to engage spool teeth in full contact. Spool 562 is free to rotate once the user presses latch 582 out of the way of the spool teeth. At that point, the height of the device can be moved up and down until latch 582 is released, which allows the lock bias member to push latch 582 back to the default, locked position.

Figure 32:
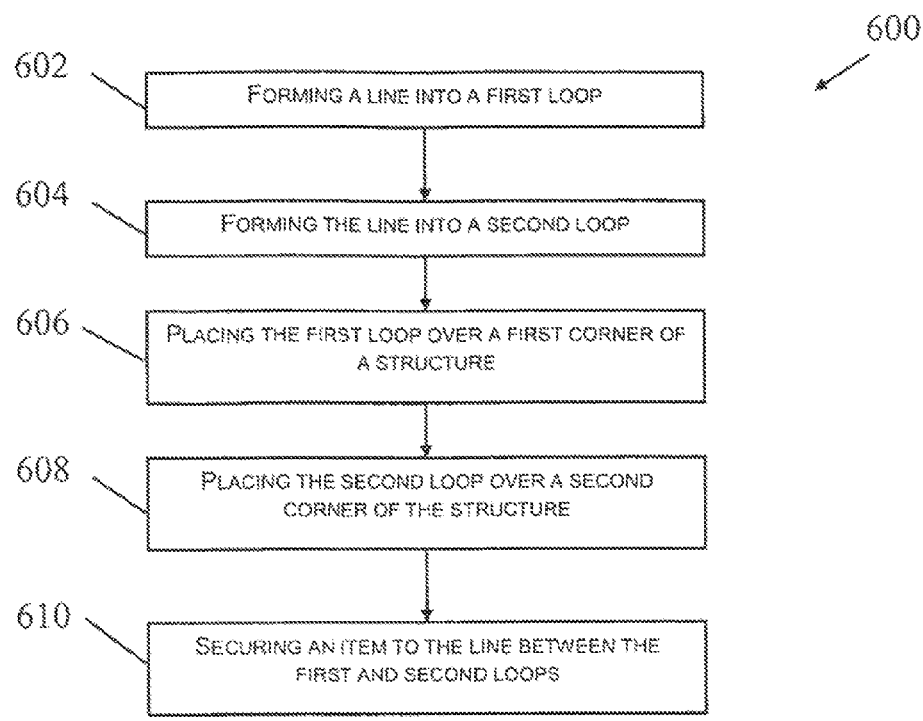
FIG. 32 is a flow chart showing one example of a method of hanging items.

Shifting attention to FIG. 32, a method 600 of hanging an item from a structure is described. Method 600 is directed to hanging an item, such as a wreath or other object with a line configured to bear tension. The structure may be a door or other structure having a top edge that extends between first and second corners.

As shown in FIG. 32, method 600 includes forming a line into a first loop at step 602 and forming the line into a second loop at step 604. Method 600 further includes placing the first loop over a first corner of a structure at step 606 and placing the second loop over a second corner of the structure at step 608. In the example shown in FIG. 32, the final step 610 involves securing the item to the line between the first and second loops. A first portion of the line is defined to extend between the item and the first corner. A second portion of the line is defined to extend between the item and the second corner.

Forming the line into loops at steps 602 and 604 may be accomplished by tying ends of the line onto intermediate portions of the line. Additionally or alternatively, forming the line into loops at steps 602 and 604 may include binding an end of the line to an intermediate portion of the line with a fastener, such as a clip, cleat, or twist tie.

Placing the first and second loops over the first and second corners at steps 606 and 608 is typically sufficient to secure the line to the structure. However, in some examples, the loops are further secured with a cross member coupled to each loop. Additionally or alternatively, the loops may be further secured by securing them directly to the door with a fastener, such as Velcro or adhesives.

Securing the item to the line between the loops at step 610 may include first securing a hook to the line between the loops and then securing the item to the hook. Using a hook can be convenient in certain applications because the item need not be directly fastened to the line, such as by tying the item to the line, but instead can be removably mounted to the hook.

In some examples, method 600 further includes the step of adjusting the length of the first portion, adjusting the length of the second portion, or adjusting the length of both portions. The length may be adjusted by coupling the first portion to the second portion and allowing the remaining portion of the line to hang down to the item. The length of the one or more portions may be adjusted to a desired length by coupling the first portion to the second portion at a desired position along the length of the first and second portions. In some examples, the first portion is coupled to the second portion with a fastener, such as a clip, cleat, or twist tie. In other examples, the two portions are tied together.

Figure 33:
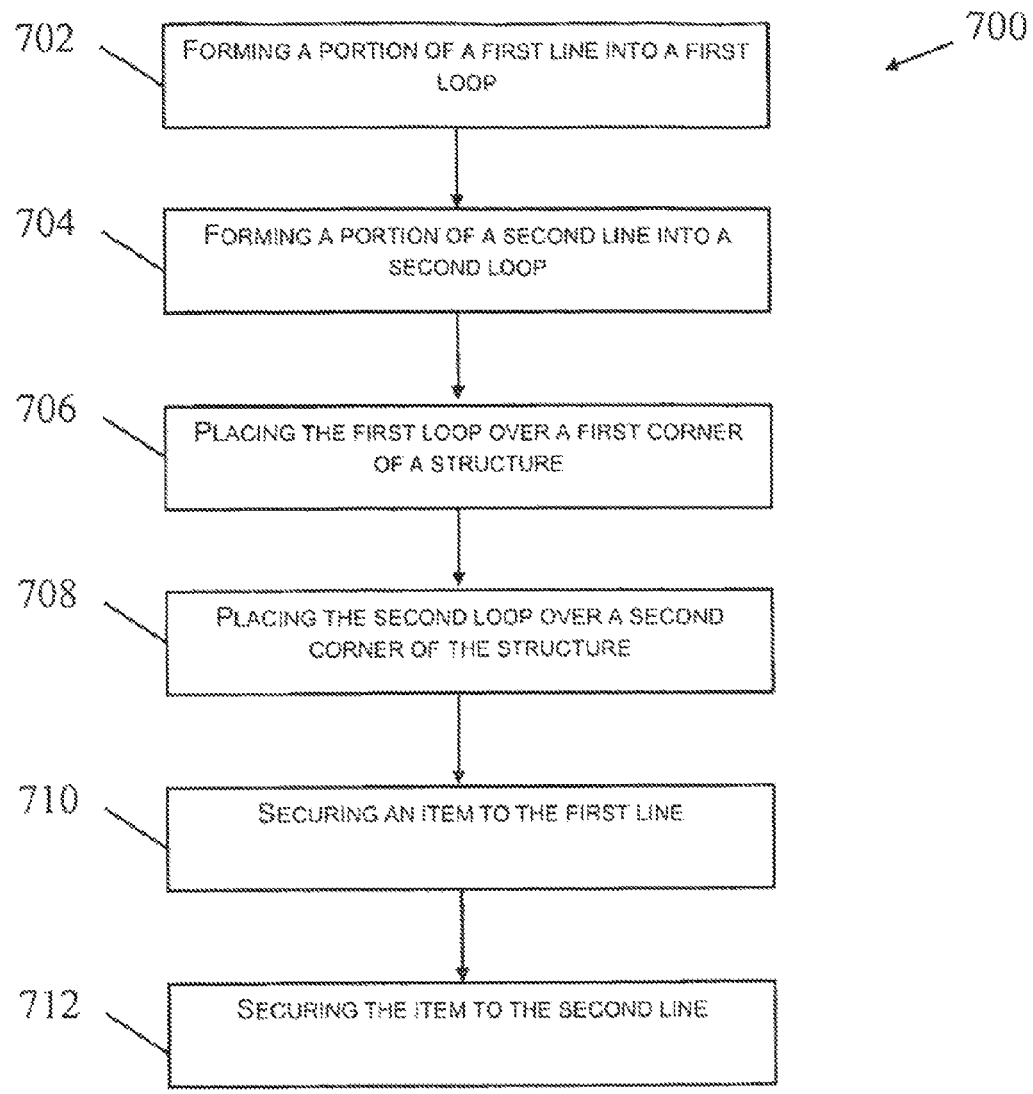
FIG. 33 is a flow chart of a second example of a method of hanging items.

With reference to FIG. 33, a method 700 is described. As with method 600, method 700 is directed to hanging an item, such as a wreath or other object to a structure, such as a door. However, in method 700 two lines configured to bear tension are used. As described previously, the structure may have a top edge that extends between first and second corners.

As shown in FIG. 33, method 700 includes forming a portion of a first line into a first loop at step 702 and forming a portion of a second line into a second loop at step 704. Method 700 further includes placing the first loop over the first corner of the structure at step 706 and placing the second loop over the second corner of the structure at step 708. In the example shown in FIG. 33, method 700 also includes securing the item to the first line at step 710 and securing the item to the second line at step 712.

Forming the lines into first and second loops at steps 702 and 704 may be accomplished by tying ends of each line onto intermediate portions of the respective lines. Additionally or alternatively, forming the lines into loops at steps 702 and 704 may include binding a portion of the first line to a portion of the second line with a fastener, such as a clip, cleat, or twist tie.

Placing the first and second loops over the first and second corners at steps 706 and 708 is typically sufficient to secure the line to the structure. However, in some examples, the loops are further secured with a cross member coupled to each loop. Additionally or alternatively, the loops may be further secured by securing them directly to the door with a fastener, such as Velcro or adhesives.

Securing the item to the first line and securing the item to the second line at steps 710 and 712 may include securing the item to terminal ends of the lines distal the first and second loops. The first and second lines may couple to the item on opposite sides of the item. In this manner, the item hangs at the bottom of each line and serves to link the two lines together.

Alternatively, securing the item to the first line and securing the item to the second line at steps 710 and 712 may include securing a hook to the first line and to the second line. Using a hook can be convenient in certain applications because the item need not be directly fastened to the line, such as by tying the item to the line, but instead can be removably mounted to the hook.

In some examples, method 700 includes the step of adjusting the position of the item relative to the structure. Adjusting the position of the item relative to the structure may include securing the item to the first line at a new position along the length of the first line compared to where it was secured to the first line previously. Additionally or alternatively, adjusting the position of the item relative to the structure may include securing the item to the second line at a new position along the length of the second line compared to where the item was secured to the second line previously.

It is believed that the disclosure set forth above encompasses multiple distinct inventions with independent utility. While each of these inventions has been disclosed in a particular form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it is within the scope of the present inventions that such disclosure or claims may be understood to include incorporation of one or more such elements, neither requiring nor excluding two or more such elements.

Applicant reserves the right to submit claims directed to certain combinations and subcombinations that are directed to one or more of the disclosed inventions and that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A hanger for supporting an item from a structure, comprising:
   a body defining a cavity and being configured to engage and thereby support the item;
   an adjustment mechanism mounted to the body and housed inside the cavity;
   a line configured to bear tension and coupled to the adjustment mechanism, the line including:
      a first end forming a first loop configured to secure around a first portion of the structure; and
      a second end forming a second loop configured to secure around a second portion of the structure; and
   wherein the adjustment mechanism is configured to selectively adjust the position of the body relative to the structure by adjusting the length of the line extending between the adjustment mechanism and the first and second portions of the structure, respectively, around which the line is secured.

2. The hanger of claim 1, further comprising a locking mechanism configured to selectively restrict the adjustment mechanism from adjusting the length of the line between the adjustment mechanism and the portions of the structure to which the line is coupled.

3. The hanger of claim 1, wherein the body defines a hook upon which the item may be supported.

4. The hanger of claim 3, wherein the hook defines ribs for structural rigidity.

5. The, hanger of claim 1, wherein the body includes a soft exterior surface facing the structure to avoid damaging the structure.

6. The hanger of claim 1, wherein the structure is a door.

7. The hanger of claim 1, further comprising a fastener configured to secure portions of the line together to form a loop.

8. The hanger of claim 1, further comprising a plurality of lines coupled to the adjustment mechanism.

9. The hanger of claim 1, wherein the body defines a guide slot for orienting the line as it extends from the adjustment mechanism out of the cavity.

10. The hanger of claim 1, wherein the adjustment mechanism includes:
a spool rotatably mounted to the body and coupled to the line, the spool being configured to:
wind up the line to shorten the length of the line extending between the adjustment mechanism and the portions of the structure to which the line is secured around when rotated in a first direction; and
unspool the line to increase the length the line extending between the adjustment mechanism and the portions of the structure to which the line is secured around when rotated in a second direction; and
a rotation biasing member operatively connected to the body and to the spool, the rotation biasing member configured to bias the spool to rotate in the first direction.

11. The hanger of claim 10, wherein the rotation biasing member includes a negator spring.

12. The hanger of claim 10, wherein:
the hanger further comprises a locking mechanism mounted to the body and configured to selectively restrict the adjustment mechanism from adjusting the length of the line extending between the adjustment mechanism and the structure;
the locking mechanism includes a latch that is positioned adjacent the spool and that is configured to selectively move toward the spool, the latch including latch teeth facing the spool; and
the spool includes spool teeth that are complimentarily configured with the latch teeth to intermesh with the latch and restrict the spool from rotating when the latch is selectively moved toward the spool.

13. The hanger of claim 12, wherein spool teeth are located on an outer periphery of the spool.

14. The hanger of claim 12, wherein the spool teeth are located on an inner periphery of the spool.

15. The hanger of claim 12, wherein the locking mechanism includes a lock biasing member operatively connected to the body and to the latch, the lock biasing member being configured to bias the latch toward the spool in a position where the latch teeth and the spool teeth are intermeshed.

16. The hanger of claim 15, wherein the latch is pivotally connected to the body in a position accessible to a user for the user to selectively pivot the latch toward the spool to restrict the spool from rotating.

17. The hanger of claim 15, wherein the latch is mounted to the body and configured to slide along a latch axis transverse to a spool axis around which the spool rotates, the latch being mounted to the body in a position accessible to a user for the user to selectively slide the latch along the latch axis toward the spool to restrict the spool from rotating.

18. The hanger of claim 15, wherein the latch is mounted to the body and configured to slide along a latch axis parallel to a spool axis around which the spool rotates, the latch being mounted to the body in a position accessible to a user for the user to selectively slide the latch along the latch axis toward the spool to restrict the spool from rotating.

19. The hanger of claim 15, wherein the spool teeth define a tooth slope that is selected to cause the spool to slide relative to the latch when the latch teeth are intermeshed with the spool teeth and the item has a weight greater than the bias force of the lock bias member.

20. The hanger of claim 1, wherein:
the body defines first and second bearing surfaces that are each at least partially curved about a rotation axis and spaced from one another along the rotation axis; and
the adjustment mechanism includes a spool coupled to the line and supported by the first and second bearing surfaces at a first spool end and a second spool end, respectively, the spool being configured to both rotate around the rotation axis and translate along the rotation axis.

21. The hanger of claim 20, wherein:
the spool includes spool teeth adjacent the first spool end;
the first bearing surface includes latch teeth that are complimentarily configured with the spool teeth to intermesh with the spool teeth when the spool teeth are aligned with the latch teeth by translating the spool along the rotation axis; and
the spool is restricted from rotating when the spool teeth intermesh with the latch teeth.

22. The hanger of claim 21, further comprising a biasing member to bias the spool along the rotation axis to a position where the latch teeth are not aligned with the spool teeth.

23. The hanger of claim 21, wherein the spool includes a handle for a user to manipulate the spool, die handle being adjacent either the first spool end or the second spool end.

24. A hanger or supporting an item from a structure including at least first and second corners, comprising:
a hook configured to support the item;
a body coupled to the hook;
an adjustment mechanism mounted to the body;
a first line configured to bear tension and including a first end and a second end, the first end of the first line being coupled to the adjustment mechanism and the second end of the first line forming a first loop configured to extend around the first corner of the structure; and
a second line configured to bear tension and including a first end and a second end, the first end of the second line being coupled to the adjustment mechanism and the second end of the second line forming a second loop configured to extend around the second corner of the structure;
wherein the adjustment mechanism is configured to selectively adjust the position of the body relative to the structure by adjusting the length of the first line and of the second line extending between the adjustment mechanism and the first corner and second corner, respectively, of the structure around which the first line and the second line extend.

25. A hanger for supporting an item from a structure, comprising:
a body including a hook, the hook being configured to engage and thereby support the item;
a spool rotatably mounted to the body;
a locking mechanism mounted to the body adjacent the spool and including a latch configured to restrict the spool from rotating by selectively contacting the spool; and
two or more lines configured to bear tension and coupled to the spool, the two or more lines extending from the body and forming terminal loops to couple with two or more different portions of the structure for hanging the body from the structure,
wherein the spool and the locking mechanism cooperate to adjust the position of the body relative to the structure when the spool selectively rotates to wind up or release the two or more lines attached to the spool and the latch selectively contacts the spool to restrict the spool from rotating further when the body is in a desired position relative to the structure.

* * * * *